United States Patent
Al-Mohssen et al.

(10) Patent No.: US 10,324,435 B2
(45) Date of Patent: Jun. 18, 2019

(54) APPARATUS AND METHOD FOR OCCUPANCY BASED DEMAND RESPONSE DISPATCH PRIORITIZATION

(71) Applicant: ENERNOC, INC., Boston, MA (US)

(72) Inventors: Husain Al-Mohssen, Dedham, MA (US); Elizabeth J. Main, Cambridge, MA (US); Angela S. Bassa, Stoneham, MA (US)

(73) Assignee: Enel X North America, Inc., Boston, MA (US)

( * ) Notice: Subject to any disclaimer, the term of this patent is extended or adjusted under 35 U.S.C. 154(b) by 277 days.

(21) Appl. No.: 15/145,093

(22) Filed: May 3, 2016

(65) Prior Publication Data
US 2017/0322530 A1    Nov. 9, 2017

(51) Int. Cl.
*G06F 19/00* (2018.01)
*G05B 19/042* (2006.01)
(Continued)

(52) U.S. Cl.
CPC ........... *G05B 19/042* (2013.01); *G05B 15/02* (2013.01); *G08G 1/00* (2013.01); *G08G 1/0145* (2013.01);
(Continued)

(58) Field of Classification Search
None
See application file for complete search history.

(56) References Cited

U.S. PATENT DOCUMENTS

| 5,978,769 A | 11/1999 | Brown et al. |
| 2004/0117330 A1 | 6/2004 | Ehlers et al. |

(Continued)

OTHER PUBLICATIONS

Kleiminger et al., Occupancy Detection from Electricity Consumption Data, Nov. 11-15, 2013, Proceedings of the 5th ACM Workshop on Embedded Systems for Energy-Efficient Buildings.*

*Primary Examiner* — Brian W Wathen
*Assistant Examiner* — Hung H Dang
(74) *Attorney, Agent, or Firm* — Richard K. Huffman

(57) ABSTRACT

An apparatus for prioritizing a demand response program event based on occupancy for one or more buildings of one or more building types participating in a demand response program is provided. The apparatus has an occupancy estimator and a dispatch controller. The occupancy estimator is configured to receive energy consumption and outside temperature streams corresponding to a portion of the one or more buildings, and is configured to employ occupancy components for each of the one or more buildings within the portion to process the streams, and is configured to generate occupancy levels corresponding to the one or more buildings within the portion, where the occupancy components and the occupancy levels are generated by exclusively processing the streams, and is configured to assign the occupancy levels to remaining ones of the one or more buildings not in the first portion. The a dispatch controller is configured to employ the occupancy components to maintain a global energy use model for the one or more buildings, and is configured to transmit dispatch messages to selected ones of the one or more buildings to reduce energy consumption by a prescribed amount for a prescribed period of time, to achieve objectives of the demand response program event.

21 Claims, 10 Drawing Sheets

OCCUPANCY DETERMINATION SYSTEM

(51) Int. Cl.
*G05B 15/02* (2006.01)
*G08G 1/00* (2006.01)
*G08G 1/01* (2006.01)

(52) U.S. Cl.
CPC ............... *G05B 2219/2639* (2013.01); *G05B 2219/2642* (2013.01)

(56) References Cited

U.S. PATENT DOCUMENTS

| | | |
|---|---|---|
| 2007/0043478 A1 | 2/2007 | Ehlers et al. |
| 2007/0182580 A1 | 8/2007 | Elwell |
| 2008/0316055 A1 | 12/2008 | Bachelder et al. |
| 2009/0185542 A1 | 7/2009 | Zhang et al. |
| 2011/0196513 A1 | 8/2011 | Willig et al. |
| 2012/0035776 A1 | 2/2012 | Zaragoza et al. |
| 2012/0310376 A1 | 12/2012 | Krumm et al. |
| 2013/0204402 A1 | 8/2013 | Mezic et al. |
| 2013/0289952 A1 | 10/2013 | Marwah et al. |
| 2014/0277795 A1* | 9/2014 | Matsuoka .......... G06Q 30/0202 700/291 |
| 2014/0316747 A1* | 10/2014 | Obst .................. G06F 17/5004 703/1 |
| 2014/0375206 A1 | 12/2014 | Holland et al. |
| 2015/0006463 A1 | 1/2015 | Fadell et al. |
| 2015/0019037 A1 | 1/2015 | Koch |
| 2015/0095118 A1 | 4/2015 | Buchanan |
| 2015/0149245 A1 | 5/2015 | Duan et al. |
| 2016/0012340 A1 | 1/2016 | Georgescu et al. |
| 2016/0110652 A1 | 4/2016 | Merideth et al. |

\* cited by examiner

HOURLY FACILITY ENERGY CONSUMPTION PROFILES

OCCUPANCY BASED ENERGY CONSUMPTION MANAGEMENT SYSTEM

ENERGY MANAGEMENT SYSTEM EMPLOYING ESTIMATED RESOURCE UTILIZATION

OCCUPANCY BASED MANAGEMENT OF MULTIPLE FACILITIES

MECHANISM FOR PRIORITIZING DEMAND RESPONSE PROGRAM EVENTS

APPARATUS AND METHOD FOR OCCUPANCY BASED DEMAND RESPONSE DISPATCH PRIORITIZATION

CROSS-REFERENCE TO RELATED APPLICATIONS

This application is related to the following co-pending U.S. Patent Applications, each of which has a common assignee and common inventors.

| SERIAL NUMBER | FILING DATE | TITLE |
|---|---|---|
| (ENER.0136) | | APPARATUS AND METHOD FOR OCCUPANCY DETERMINATION |
| (ENER.0137) | | APPARATUS AND METHOD FOR OCCUPANCY BASED ENERGY CONSUMPTION MANAGEMENT |
| (ENER.0138) | | APPARATUS AND METHOD FOR AUTOMATED BUILDING SECURITY BASED ON ESTIMATED OCCUPANCY |
| (ENER.0139) | | APPARATUS AND METHOD FOR ENERGY MANAGEMENT BASED ON ESTIMATED RESOURCE UTILIZATION |
| (ENER.0140) | | APPARATUS AND METHOD FOR TRAFFIC CONTROL BASED ON ESTIMATED BUILDING OCCUPANCY |
| (ENER.0141) | | APPARATUS AND METHOD FOR TARGETED MARKETING BASED ON ESTIMATED BUILDING OCCUPANCY |
| (ENER.0142) | | APPARATUS AND METHOD FOR ENERGY MANAGEMENT OF MULTIPLE FACILITIES AS A FUNCTION OF ESTIMATED OCCUPANCY |
| (ENER.0144) | | APPARATUS AND METHOD FOR FOCUSED MARKETING MESSAGING BASED ON ESTIMATED BUILDING OCCUPANCY |
| (ENER.0145) | | APPARATUS AND METHOD FOR FORECASTING OCCUPANCY BASED ON ENERGY CONSUMPTION |

BACKGROUND OF THE INVENTION

Field of the Invention

This invention relates in general to the field energy consumption, and more particularly to an apparatus and method for occupancy determination and applications thereof.

Description of the Related Art

One problem with resources such as electricity, water, fossil fuels, and their derivatives (e.g., natural gas) is related to supply and demand. That is, production of a resource often is not in synchronization with demand for the resource. In addition, the delivery and transport infrastructure for these resources is limited in that it cannot instantaneously match production levels to provide for constantly fluctuating consumption levels. As anyone who has participated in a rolling blackout will concur, the times are more and more frequent when resource consumers are forced to face the realities of limited resource production.

Another problem with resources such as water and fossil fuels (which are ubiquitously employed to produce electricity) is their limited supply along with the detrimental impacts (e.g., carbon emissions) of their use. Public and political pressure for conservation of resources is prevalent, and the effects of this pressure is experienced across the spectrum of resource providers, resource producers and managers, and resource consumers.

It is no surprise, then, that the electrical power generation and distribution community has been taking proactive measures to protect limited instantaneous supplies of electrical power by 1) imposing demand charges on consumers in addition to their monthly usage charge and 2) providing incentives for conservation in the form of rebates and reduced charges. In prior years, consumers merely paid for the total amount of power that they consumed over a billing period. Today, most energy suppliers are not only charging customers for the total amount of electricity they have consumed over the billing period, but they are additionally imposing time of use charges and charging for peak demand. Peak demand is the greatest amount of energy that a customer uses during a measured period of time, typically on the order of minutes. Time of use charges fluctuate throughout the day to dissuade customers from using energy during peak consumption hours. Moreover, energy suppliers are providing rebate and incentive programs that reward consumers for so called energy efficiency upgrades (e.g., lighting and surrounding environment intelligently controlled, efficient cooling and refrigeration, etc.) in their facilities that result in reductions of both peak consumption, time of use consumption shifting, and overall energy consumption. Similar programs are prevalent in the water production and consumption community as well. It is anticipated that such programs will extend to other limited supply energy sources, such as, but not limited to, natural gas.

Demand reduction and energy efficiency programs may be implemented and administered directly by energy providers (i.e., the utilities themselves) or they may be contracted out to third parties, so called energy services companies (ESCOs). ESCOs directly contract with energy consumers and also contract with the energy providers to, say, reduce the demand of a certain resource in a certain area by a specified percentage, where the reduction may be constrained to a certain period of time (i.e., via a demand response program). Or, the reduction effort may be ongoing (i.e., via an energy efficiency program).

The above scenarios are merely examples of the types of programs that are employed in the art to reduce consumption and foster conservation of limited resources. Regardless of the vehicle that is employed, what is important to both producers and consumers is that they be able to understand and appreciate the effects of demand reduction and efficiency improvements that are performed, say, on individual buildings, groups of dissimilar buildings, or buildings of a similar type. How can a building manager know that the capital outlay made to replace 400 windows will result in savings that allow for return of capital within three years? How does an ESCO validate for a contracting regional transmission operator (e.g., Tennessee Valley Authority) that energy efficiency programs implemented on 1,000 consumers will result in a 15 percent reduction in baseline power consumption?

The answers to the above questions are not straightforward, primarily because, as one skilled in the art will appreciate, several factors both drive and often tend to obscure energy consumption. Weather conditions drive consumption, and their effects are significant. For instance, how can a building's energy consumption in January of one year be compared to its consumption in January of another year when average temperatures in the two month's being compared differ by 25 degrees? Is the difference between the two month's power consumption due to weather, or implementation of an energy efficiency program, or a combination of both?

Fortunately, those in the art have developed complex, but widely accepted, normalization techniques that provide for weather normalization of energy use data so that consumption by a building in two different months can be compared without the confusion associated with how outside temperature affects energy use. These modeling techniques provide for normalization of energy use data for buildings and groups of buildings, and they are accurate for the above purposes when employed for energy use periods typically ranging from years down to days. That is, given sufficient historical energy use ("training") data, models are developed using these normalization techniques, which are acceptable for estimation of a building's energy consumption as a function of outside temperature. These estimates are then employed by the models to remove weather effects from an energy use profile—be it in the past, present or future—and also to predict energy use as a function of temperature.

The present inventors have observed, however, that another significant factor drives energy consumption, and also substantially complicates energy efficiency evaluations. This factor is sometimes referred to as "occupancy," because in an office or similar facility (e.g., hospital, school, concert hall, airport, poultry shed, etc.) providing for comfort of human or animal life, the amount of energy consumed on an hourly basis (or a time increment less than one hour) is as much a function of the number of living beings that are present in a facility as it is a function of outside temperature. In facilities where energy use for purposes of production dominates (e.g., aggregate plants, steel mills, data processing facilities, server farms), this factor may be referred to as "resource utilization."

Often, occupancy and resource utilization are cyclical patterns with exceptions on a daily basis. For example, one skilled in the art will appreciate that schools, as well as most office buildings, are generally occupied on weekdays and are unoccupied on weekends, except for holidays. Schools, in addition, are partially occupied during the summer months. Likewise, hospitals are occupied year round, are partially occupied on weekends (as a function of weekend staff reductions), and are over-occupied during flu season. Shopping malls tend to be occupied when school is not in session and are over occupied around and during holidays. Regarding facilities where resource utilization dominates, one skilled in the art will appreciate that server farms utilize more energy around and during holidays because of increased e-commerce, and production facilities utilize energy as a function of economic conditions.

Consider a school which has undergone substantial energy efficiency improvements, but which has also increased in attendance by, say, 20 percent over the previous year. To judge the efficacy of the improvements, an ESCO or other third party may desire to compare the school's energy consumption in, say, September of the new year with that of September of the previous year, where the previous year's energy consumption data has been employed as training data for energy use modeling purposes. As noted above, acceptable techniques provide for normalizing both sets of energy consumption data to remove the effects of weather. But, as one skilled in the art will appreciate, the effects of occupancy changes in the new year will significantly obscure the resulting comparison because more energy per student is consumed in the new year due to the increase in attendance. To remove the effect that occupancy has on this comparison, present day techniques resort to woefully deficient methods such as scaling, "eyeballing," and other such means that require analyst intervention and subjective judgment. That is, an analyst may judge that a facility is partially occupied because its energy consumption lies at approximately halfway between its minimum and maximum energy consumption values in the training data set. The present inventors have observed that these techniques are disadvantageous and limiting in situations where occupancy need be determined in near real time on a daily basis, or where occupancy (or resource utilization) is to be estimated for a collocated number of facilities or a group of similar facilities. That fact is that occupancy at an aggregated level is incredibly difficult to determine and predict, not only for comparative purposes, but also for purposes of real time control.

Therefore, what is needed is an apparatus and method for automatically determining occupancy of one or more facilities based solely on outside temperature and energy consumption.

What is also needed is a technique for managing the energy consumption of one or more facilities using determined occupancy, where the occupancy is determined as a function of outside temperature and energy use during previous hours.

What is further needed is a technique for controlling security devices and processes in one or more buildings using determined occupancy, where the occupancy is determined as a function of outside temperature and energy use during previous hours.

What is also needed is a technique for managing the energy consumption of one or more facilities using determined resource utilization, where the resource utilization is determined as a function of outside temperature and energy use during previous hours.

What is additionally needed is an occupancy based market control system, where market control devices and processes utilize determined occupancy of corresponding facilities that is determined as a function of outside temperature and energy use during more recent hours.

What is yet also needed is an occupancy based targeted marketing system, where advertising control devices, displays, messaging, and associated processes utilize determined occupancy of corresponding facilities that is determined as a function of outside temperature and energy use during more recent hours.

What is moreover needed is a technique for managing the energy consumption of one or more substantially similar facilities using determined occupancy, where the occupancy is determined as a function of outside temperature and energy use during previous hours.

What is further needed is a mechanism for prioritizing demand response program events, where the events are prioritized according to determined occupancy or resource utilization, and where such determinations are made on the basis of outside temperature and energy use.

What is additionally needed is an apparatus and method for focused marketing messaging based on estimated building occupancy.

What is yet further needed is a technique for forecasting occupancy of buildings based on their energy consumption patterns.

SUMMARY OF THE INVENTION

The present invention, among other applications, is directed to solving the above-noted problems and addresses other problems, disadvantages, and limitations of the prior art. The present invention provides a superior technique for determining building occupancy levels as a function of energy consumption. In one embodiment, an apparatus for prioritizing a demand response program event based on occupancy for one or more buildings of one or more building types participating in a demand response program is provided. The apparatus has an occupancy estimator and a dispatch controller. The occupancy estimator is configured to receive energy consumption and outside temperature streams corresponding to a portion of the one or more buildings, and is configured to employ occupancy components for each of the one or more buildings within the portion to process the streams, and is configured to generate occupancy levels corresponding to the one or more buildings within the portion, where the occupancy components and the occupancy levels are generated by exclusively processing the streams, and is configured to assign the occupancy levels to remaining ones of the one or more buildings not in the first portion. The a dispatch controller is configured to employ the occupancy components to maintain a global energy use model for the one or more buildings, and is configured to transmit dispatch messages to selected ones of the one or more buildings to reduce energy consumption by a prescribed amount for a prescribed period of time, to achieve objectives of the demand response program event.

One aspect of the present invention contemplates a computer data signal embodied in a non-transitory storage medium, having computer readable program code for providing an apparatus for prioritizing a demand response program event based on occupancy for one or more buildings of one or more building types participating in a demand response program event. The computer readable code has first and second program code. The first program code provides an occupancy estimator, configured to receive energy consumption and outside temperature streams corresponding to a portion of the one or more buildings, and configured to employ occupancy components for each of the one or more buildings within the portion to process the streams, and is configured to generate occupancy levels corresponding to the one or more buildings within the portion, where the occupancy components and the occupancy levels are generated by exclusively processing the streams, and configured to assign the occupancy levels to remaining ones of the one or more buildings not in the first portion according to building type. The second program code provides a dispatch controller, configured to employ the occupancy components to maintain a global energy use model for the one or more buildings, and configured to transmit dispatch messages to selected ones of the one or more buildings to reduce energy consumption by a prescribed amount for a prescribed period of time, to achieve objectives of the demand response program event.

Another aspect of the present invention comprehends a method for prioritizing a demand response program event based on occupancy for one or more buildings of one or more building types participating in a demand response program. The method includes receiving energy consumption and outside temperature streams corresponding to a portion of the one or more buildings, and employing occupancy components for each of the one or more buildings within the portion to process the streams, and generating occupancy levels corresponding to the one or more buildings within the portion, where the occupancy components and the occupancy levels are generated by exclusively processing the streams, and assigning the occupancy levels to remaining ones of the one or more buildings not in the first portion; and employing the occupancy components to maintain a global energy use model for the one or more buildings, and transmitting dispatch messages to selected ones of the one or more buildings to reduce energy consumption by a prescribed amount for a prescribed period of time, to achieve objectives of the demand response program event.

BRIEF DESCRIPTION OF THE DRAWINGS

These and other objects, features, and advantages of the present invention will become better understood with regard to the following description, and accompanying drawings where.

DETAILED DESCRIPTION

Figure 1:
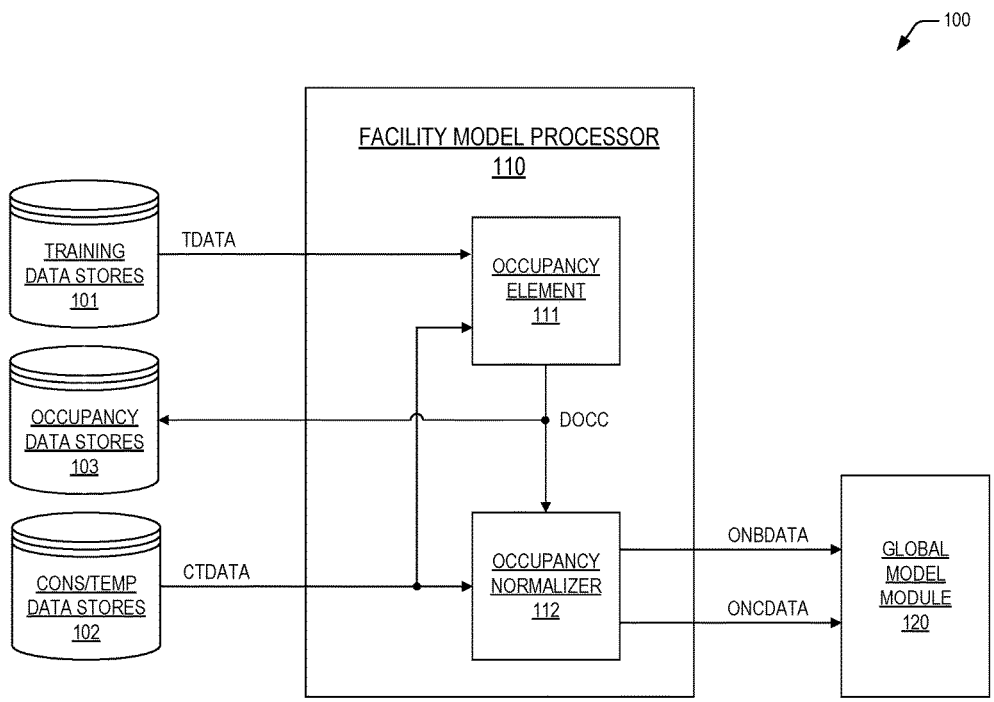
FIG. 1 is a block diagram illustrating an occupancy determination system according to the present invention.

Exemplary and illustrative embodiments of the invention are described below. In the interest of clarity, not all features of an actual implementation are described in this specification, for those skilled in the art will appreciate that in the development of any such actual embodiment, numerous implementation specific decisions are made to achieve specific goals, such as compliance with system-related and business related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well-known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase.

In view of the above background discussion on energy consumption management and associated present day techniques for determining occupancy of a building and for determining utilization of one or more resources, a discussion of the present invention will now be presented with reference to FIGS. 1-11.

Turning to FIG. 1, a block diagram is presented illustrating an occupancy determination system 100 according to the present invention. The system 100 includes a facility model processor 110. The facility model processor 110 may include an occupancy element 111 that is coupled to an occupancy normalizer 112 via a determined occupancy parameter bus DOCC. The occupancy element 111 is coupled to training data stores 101 via a training data bus TDATA. The occupancy element 111 and the occupancy normalizer 112 are coupled to occupancy data stores 103 via bus DOCC, and to consumption/temperature data stores 102 via a consumption data bus CTDATA. The occupancy normalizer 112 is coupled to a global model module 120 via an an occupancy normalized baseline data bus ONBDATA and an occupancy normalized consumption data bus ONCDATA.

In one embodiment, the facility model processor 110 may be disposed in a network operations center (NOC) associated with a utility provider or ESCO. In another embodiment, the facility model processor 110 may be disposed in a corresponding facility. The facility model processor 110 may comprise hardware, or a combination of hardware and software, configured to perform the functions described hereinbelow. In one embodiment, the facility model processor 110 may comprise a microprocessor or other suitable central processing unit (CPU) (not shown) coupled to a transitory random access memory (not shown) and/or a non-transitory read-only memory (not shown) within which application programs (i.e., software) are disposed that, when executed by the microprocessor/CPU, perform the functions described hereinbelow. The data stores 101-103 may be disposed as conventional transitory or non-transitory data storage mechanisms and the buses TDATA, DOCC, CTDATA, ONBDATA, ONCDATA may comprise conventional wired or wireless technology buses for transmission and reception of data including, but not limited to, direct wired (e.g., SATA), cellular, BLUETOOTH®, Wi-Fi, Ethernet, and the internet.

The global model module 120 may be configured as an energy management control device, described in further detail below, or as an energy profile evaluation device. As an energy profile evaluation device, the global model module 120 may include a display such as, but not limited to, a wall-mounted display, a desktop display, a laptop display, a tablet display, or a mobile phone display.

In operation, the occupancy determination system 100 according to the present invention may be employed for purposes of generating an accurate daily occupancy model for a given facility or building having time increments of two hours or less (i.e., 1-hour increments, 30-minute increments, 15-minute increments, etc.), and for purposes of employing the daily occupancy model to compare occupancy normalized consumption data derived from the energy consumption data provided over CTDATA from the consumption/temperature data stores 102 with occupancy normalized baseline data derived from training data provided over TDATA from the training data stores 101, and further to forecast occupancy and resulting energy consumption for future dates. The daily occupancy model, as will be described in more detail below, may comprise a lower bound component of building energy consumption as a function of outside temperature, a normalized occupancy profile component as a function of time increment employed, a marginal energy component as a function of outside temperature, and a daily occupancy level component. The aforementioned components are generated by the occupancy element 111 based upon the values of training data provided from the training data stores 101 over TDATA. In one embodiment, the aforementioned components may be generated based upon the values of the training data and progressively revised (i.e., iterated) based upon the values of energy consumption data provided from the consumption/temperature data stores 102. In one embodiment, the consumption/temperature data stores 102 may comprise a transmitted data stream from one or more sources over wired or wireless technology communication links.

Upon generation (and revision, if applicable), the aforementioned components are transferred over bus DOCC to the occupancy data stores 103, and the occupancy normalizer 112 may access the occupancy data stores 103 to retrieve the aforementioned components for purposes of occupancy normalizing (i.e., removing effects of occupancy on energy consumption) the training data and/or the energy consumption data for the given building. The occupancy normalized baseline data may be transferred to the global model module 120 over bus ONBDATA and the occupancy normalized consumption data may be transferred to the global model module 120 over bus ONCDATA. In another embodiment, the occupancy normalizer 112 may transfer the occupancy normalized baseline along with a forecasted occupancy normalized energy consumption to the global model module 120, where the forecasted occupancy normalized energy consumption is generated for a future time period and is based on outside temperature forecasts retrieved from the consumption/temperature data stores 102 and the aforementioned components. In a further embodiment, the occupancy normalizer 112 may employ the occupancy normalized baseline in conjunction with the aforementioned components to generate a forecasted energy consumption to the global model module 120, where the forecasted energy consumption is generated for a future time period and is based on outside temperature forecasts retrieved from the consumption/temperature data stores 102, and which employs the aforementioned components to develop the forecasted energy consumption to include the effects of forecasted occupancy.

Thereafter, the global model module 120 may generate and display comparisons of the occupancy normalized energy consumption with the occupancy normalized baseline data for purposes of enabling a building manager to evaluate the efficacy of energy efficiency improvements performed on the facility subsequent to generation of the training data and prior to generation of the energy consumption data. In another embodiment, the global model module 120 may generate comparisons of the occupancy normalized energy consumption with the occupancy normalized baseline data for purposes of enabling a building manager to retroactively visualize the efficacy of energy efficiency improvements performed on the facility prior to generation of the training data and subsequent to generation of the energy consumption data. In an additional embodiment, the global model module 120 may generate comparisons of the occupancy normalized energy consumption with the occupancy normalized baseline data for purposes of enabling a building manager to detect abnormal daily energy usage for the facility by comparing the occupancy normalized consumption data with the occupancy normalized baseline data. In such a comparison, the global model module 120 may visually display an approximate expected range of occupancy normalized energy consumption values for a given time period as a function of the occupancy normalized baseline data. In yet another embodiment, the global model module 120 may display the forecasted energy consumption for purposes of enabling a building manager to plan future energy acquisitions.

Numerous other embodiments may be configured for the global model module 120 as need arises for comparison of occupancy normalized consumption data with occupancy normalized baseline data on a daily, weekly, monthly, yearly, etc. level, where the building manager may be presented with an expected occupancy normalized energy consumption profile (based on the occupancy normalized baseline data and the aforementioned components) along with what the given building actually consumed (based on the occupancy normalized consumption data) in the past, the near-real time present, or projected for the future. In other embodiments, the occupancy determination system 100 may be employed to perform the above noted functions for a plurality of buildings.

The above generated comparisons may be employed by the global model module 120 when configured as an energy management control device to provide for scheduling of building controls (not shown) in order to optimize energy consumption by the building. In such a configuration, the global model module 120 may optimize the energy consumption of the building for comfort purposes prior to or during demand response program events (e.g., load shedding), to preclude time of use charges, or to achieve energy reduction incentives. Accordingly, the global model module 120 may utilize the aforementioned components in conjunction with near real-time energy consumption data, provided via bus CTDATA, to determine a daily occupancy level for the building, and may perform comfort control functions, security control functions, resource control functions, market control functions, advertising functions, and other control functions based upon the determined daily occupancy level, where the daily occupancy level is determined exclusively from the energy consumption data, outside temperature data, and the aforementioned model components. Details of how the aforementioned model components are generated will now be discussed below with reference to FIGS. 2-3.

Figure 2:
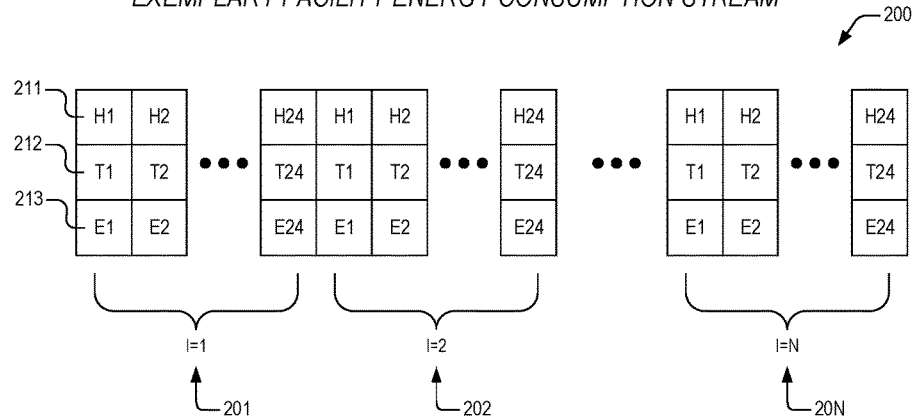
FIG. 2 is a block diagram depicting an exemplary facility energy consumption stream, such as may be employed by the occupancy determination system of FIG. 1.

Turning to FIG. 2, a block diagram is provided depicting an exemplary facility energy consumption stream 200, such as may be employed by the occupancy determination system 100 of FIG. 1. The exemplary energy consumption stream 200 is representative of both the training data stored in the training data stores 101 and the energy consumption data stored in or retrieved from the energy consumption/temperature data stores 102. The exemplary energy consumption stream 200 includes a plurality of fields 211-213 provided for each time increment in a day, where the number of days I ranges from 1 to N, and where the number of time increments in each of a plurality of days ranges from 1 to 24, thus indicating a time increment of 1 hour. The present inventors note, however, that although 1-hour increments are depicted in the exemplary energy consumption stream 200, such is provided for clarity purposes, and increments greater or lesser than 1 hour may be employed according to application.

Each incremental triplet of values includes a time increment value H1-H24 provided in field 211, an outside temperature value T1-T24 provided in field 212, and an energy consumption value E1-E24 provided in field 213. For instance, a year's worth energy consumption data for a given building having 1-hour increments will comprise 8,760 incremental triplets, each having a corresponding time increment value, outside temperature value, and energy consumption value.

Operationally, the energy consumption stream 200 may be provided or obtained in manners such as, but not limited to, from a utility provider, from a building owner, or from the building itself by metering equipment disposed therein. The energy consumption stream 200 may be utilized as training data in order to determine the lower bound component on building energy consumption as a function of outside temperature, the normalized occupancy profile component as a function of time increment employed, the marginal energy component as a function of temperature, and the daily occupancy level component as a function of a specific day value I. The energy consumption stream 200 may also be utilized as energy consumption data such as may be provided by the energy consumption/temperature data stores 102. When utilized as training data, the occupancy element 111 may generate the lower bound component on baseline building energy consumption as a function of outside temperature, the normalized occupancy profile component as a function of time increment employed, the marginal energy component as a function of outside temperature, and the daily occupancy level component as a function of a specific day value I, and provide these model components to the occupancy normalizer 112 for normalization and comparison with a different energy consumption data stream (not shown). When utilized as energy consumption data, the occupancy normalizer 112 may utilize model components provided over bus DOCC (from the occupancy element 111 or the occupancy data stores 103) to normalize the energy consumption data stream 200 for provision to the global model module 120.

Figure 3:
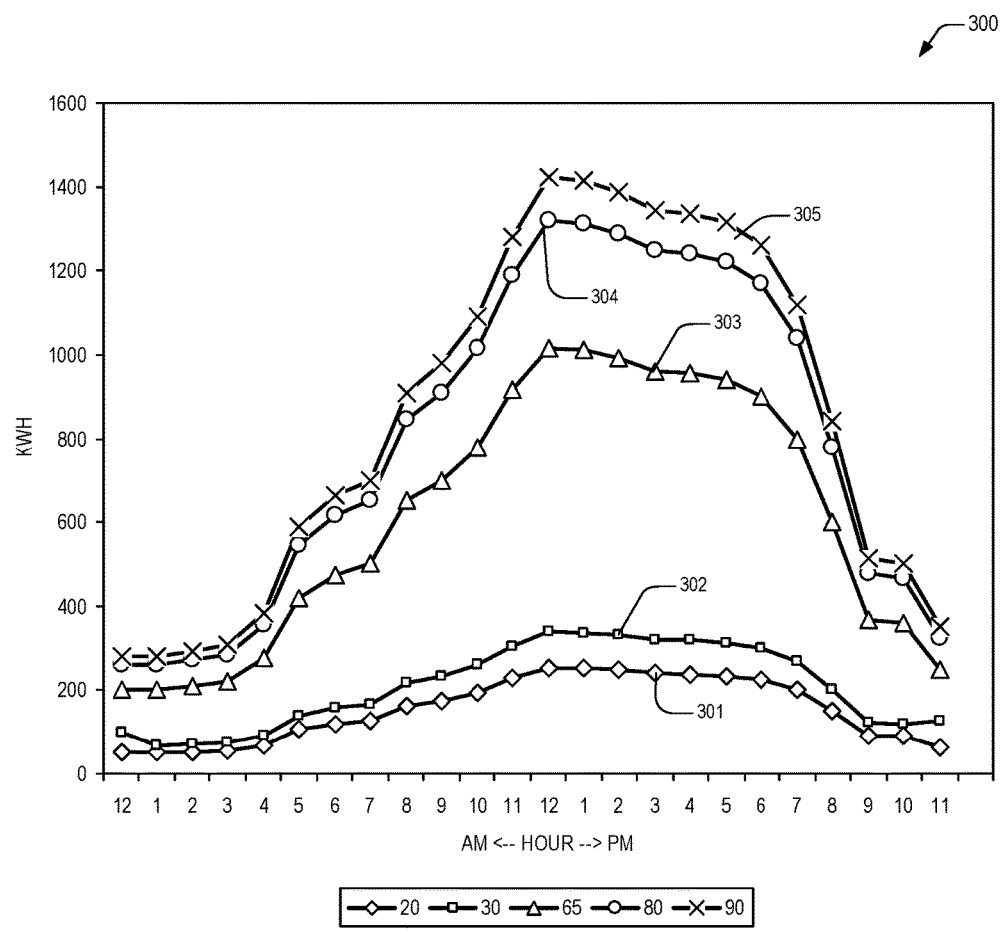
FIG. 3 is a timing diagram featuring a number of 24-hour energy consumption profiles for an exemplary facility that differ according to occupancy level.

Now referring to FIG. 3, a timing diagram 300 is presented featuring a number of 24-hour energy consumption profiles 301-305 for an exemplary facility that differ only according to occupancy level. Each of the profiles 301-305 may be configured by extracting applicable values from fields 211-213 within the energy consumption data stream 200 corresponding to desired time increment value. The diagram shows a 24-hour consumption profile 301 for days that the exemplary facility is at a 20 percent occupancy level. The diagram also shows a 24-hour consumption profile 302 for days that the exemplary facility is at a 30 percent occupancy level. The diagram additionally shows a 24-hour consumption profile 303 for days that the exemplary facility is at a 65 percent occupancy level. The diagram further shows a 24-hour consumption profile 3041 for days that the exemplary facility is at an 85 percent occupancy level. The diagram finally shows a 24-hour consumption profile 305 for days that the exemplary facility is at a 90 percent occupancy level.

What the present inventors have observed is that, regardless of changes in the magnitude of the daily occupancy level, the shape of the energy consumption profiles 301-305 is substantially the same, leading to the conclusion that the shape of a daily occupancy profile (i.e., how the number of living beings inside changes over the course of a day) for any facility, although definitely a function of the type of facility (e.g., office building, school, indoor feedlot, etc.), is substantially dominated by time of day, and the magnitude of the daily occupancy profile changes as a function occupancy level for the day. Stated differently, the amount of energy the exemplary facility consumes is a function of the number of living beings disposed therein at a given time increment, which led the present inventors to envision a model for occupancy based energy consumption having a lower energy consumption bound (i.e., when the exemplary facility is unoccupied), a normalized occupancy profile component representing occupancy level of the exemplary facility as a function of time increment during the day, a marginal energy component representing the amount of energy consumed at a particular temperature over, and a daily occupancy level component representing a scaling value for the normalized occupancy profile component.

More specifically, the occupancy element 111 operates on the training data to generate the above noted components according to the following energy consumption equation:

$$E_i(h,T) = \zeta(T) + \gamma_i f(h) D(T) + e_i(h,T), \text{ where}$$

h≡time increment index (for 1-hour increment, h goes from 1 to 24);
T≡temperature at time h;
i≡day number index;
$E_i(h,T)$ ≡energy consumption of building at time h and temperature T;
$\zeta(T)$≡lower bound of building energy consumption at temperature T;
$\gamma_i$≡daily occupancy level component;
$f(h)$≡normalized occupancy profile component as a function of h;
$D(T)$≡marginal energy component as a function of T; and
$e_i(h,T)$≡model energy consumption error at time h and temperature T.

For purposes of the present application, though the lower bound of building energy consumption is recognized to be both a function of time of day and temperature, the present inventors have noted that it is primarily driven by temperature, and thus the time increment effects on the lower bound are neglected in the model to allow for performance improvements in real-time and near real-time application scenarios. Accordingly, in one embodiment, all of the energy consumption values in the training data for each represented temperature are aggregated into corresponding temperature sets. In one embodiment, energy consumption values in insignificant (with respect to energy consumption) temperature ranges (e.g., 48-52 degrees) are binned together into a single temperature set (e.g., 50-degree set). Next, values within each of the temperature sets (i.e., values in, say, a 20-degree set, a 30-degree set, etc.) are ranked in increasing order of value, and the lowest 1-percentile value within each of the temperature sets is selected as the lower bound (or, "floor") value for that temperature set. In one embodiment, the 1-percentile value is selected in order to remove outliers which may affect the accuracy of the model. In another embodiment, 5-percentile values are employed as the lower bound.

Thus, $\zeta(T)$ represents the minimum energy consumption of a given facility and it the energy consumed for a daily occupancy component, $\gamma_i$=0. That is, when the daily occupancy component is equal to 0, such represents the energy consumption of the building when at minimum occupancy. For most buildings, the minimum occupancy reflects zero living beings present. For buildings with continuous market flow (e.g., airport, military facility), the minimum occupancy reflects a minimum number of living beings present.

Initially, the occupancy element 111 scans the training data and determines the values of $\zeta(T)$ for each of the temperature sets. Following determination of $\zeta(T)$, the occupancy element 111 operates on each energy consumption value $E_i(h,T)$ to generate a difference value from the lower energy consumption bound as follows:

$$\Delta_i(h,T) = E_i(h,T) - \zeta(T).$$

Next, the occupancy element 111 averages each of the $\Delta_i(h,T)$ values for each hour and temperature pair to generate an average daily energy consumption $\overline{\Delta}(h,T)$ for each of the hour and temperature pairs. The occupancy element then assigns the average daily consumption $\overline{\Delta}(h,T)$ as corresponding to a daily occupancy component value equal to 1, $\gamma_i$=1. That is, when the daily occupancy component is equal to 1, such represents the energy consumption of the building when at average occupancy for each time and temperature pair. Thus, according to the above energy consumption equation, $$e_i(h,T) = \overline{\Delta}(h,T) - f(h)D(T).$$

The occupancy element 111 then employs a conventional non-linear solver algorithm, as known to those skilled in the art, to solve for $f(h)$ and $D(T)$ while minimizing $e_i(h,T)$. In another embodiment, the occupancy element 111 may employ a Monte Carlo solver algorithm to solve for $f(h)$ and $D(T)$ while minimizing $e_i(h,T)$.

Once series for $f(h)$ and $D(T)$ are determined, the occupancy element 111 employs $f(h)$ and $D(T)$ to determine values of the daily occupancy level $\gamma_i$ for each day according to the following equation:

$$\gamma_i = \frac{\sum_h \Delta_i(h,T)}{\sum_h f(h)D(T)}.$$

Accordingly, the occupancy element 111 according to the present invention operates on the training data provided via bus TDATA to determine, for a given facility (or a plurality of facilities in aggregate), the lower energy consumption bound $\zeta(T)$, the normalized occupancy profile component $f(h)$, the marginal energy consumption component $D(T)$, and a daily occupancy level component $\gamma_i$ for each training data day.

The present inventors not that the derived components noted above are determined to yield an accurate total energy consumption for each day, but may vary slightly for estimates of hourly energy consumption, as one skilled in the art will appreciate, because facilities do not strictly follow their respective normalized occupancy profile component $f(h)$, though for purposes of the present invention, such hourly energy consumption estimates are sufficient.

The steps above employed by the occupancy element 111 to derive the above noted components may be iteratively employed using energy consumption/temperature data provide via bus CTDATA to improve the accuracy of the components. The above noted components $\zeta(T)$, $f(h)$, $D(T)$, $\gamma_i$ are transferred over bus DOCC to the occupancy data stores 103, from which they may be obtained for use by the occupancy normalizer 112 which, as described above, employs these components to occupancy normalize (i.e., remove the effects of building occupancy) the training data (resulting in occupancy normalized baseline data) and the energy consumption/temperature data (resulting in occupancy normalized energy consumption data). The occupancy normalizer 112 may then transfer the occupancy normalized baseline data over bus ONBDATA and the occupancy normalized energy consumption data over bus ONCDATA to the global model module 120, which may perform the functions noted above to enable a building manager to determine the efficacy of energy efficiency improvements to the building (or plurality of buildings), to perform control functions, or both.

The present invention may also employ calendar data, obtained conventionally, to allow for embodiments of the present invention to determine occupancy of one or more facilities on a given day, past, present, or future, based upon the components $\zeta(T)$, $f(h)$, $D(T)$, $\gamma_i$ derived from the training data. The calendar data may be employed to determine weekdays versus weekends, holidays, major event start and stop dates, and the like, so that values of $\gamma_i$ are utilized appropriately predicting occupancy of the one or more facilities.

Figure 4:
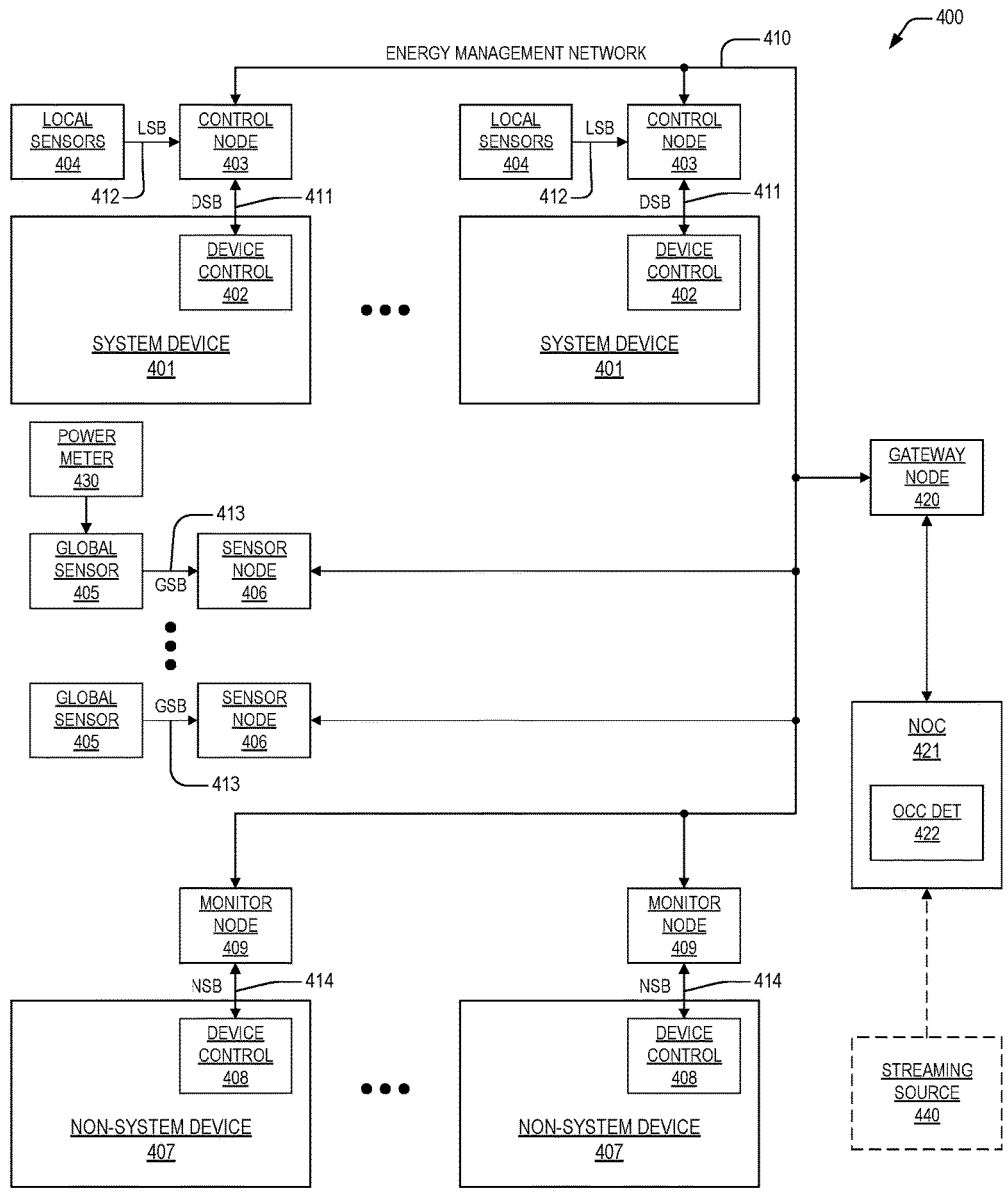
FIG. 4 is a block diagram showing an occupancy based energy consumption management system according to the present invention.

Turning now to FIG. 4, a block diagram is presented showing an occupancy based energy consumption management system 400 according to the present invention. The occupancy based energy consumption management system 400 may include a plurality of system devices 401, each of which is managed and controlled within the system 400 for purposes of energy consumption control in order to manage peak resource demand, time of day use, or energy reduction targets. In one embodiment, the system devices 401 may include air-conditioning units that are disposed within a building or other facility, and the resource that is managed may comprise electrical power. In another embodiment, the system devices 401 may comprise heating units that are disposed within a building or other facility, and the resource that is managed may comprise natural gas. The present inventors specifically note that the system 400 contemplated herein is intended to be preferably employed to control any type of resource consuming device 401 such as the units noted above, and also including, but not limited to, water pumps, heat exchangers, motors, generators, light fixtures, electrical outlets, sump pumps, furnaces, or any other device that is capable of being duty-cycle actuated in order to control use of a corresponding resource, but which is also capable, in one embodiment, of maintaining a desired level of performance ("comfort level") by advancing or deferring actuation times and increasing or decreasing duty cycles in coordination with other associated devices 401. For purposes of the present application, the term "comfort level" may also connote an acceptable level of performance for a device 401 or machine that satisfies overall constraints of an associated system 400. The present inventors also note that the present invention comprehends any form of consumable resource including, but not limited to, electrical power, natural gas, fossil fuels, water, and nuclear power. As noted above, present day mechanisms are in place by energy suppliers to levy peak demand charges for the consumption of electrical power by a consumer and, going forward, examples will be discussed in terms relative to the supply, consumption, and demand coordination of electrical power for purposes only of teaching the present invention in well-known subject contexts. However, it is noted that any of the examples discussed herein may be also embodied to employ alternative devices 401 and resources as noted above for the coordination of peak demand of those resources within a system 400. It is further noted that the term "facility" is not to be restricted to construe a brick and mortar structure, but may also comprehend any form of interrelated system 400 of devices 401 whose performance can be modeled and whose actuations can be scheduled and controlled in order to control and manage the demand of a particular resource.

Having noted the above, each of the devices 401 includes a device control 402 that operates to turn the device 401 on, thus consuming a resource, and off, thus not consuming the resource. When the device 401 is off, a significant amount of the resource is consumed, and thus a device that is off does not substantially contribute to overall cumulative use of the resource. Although implied by block diagram, the present inventors note that the device control 402 also may not be disposed within the device 401, and the device control 402 may not be collocated with the device 401 as, for example, in the case of a remote control as is employed by a building automation system.

A control node 403 according to the present invention is coupled to each of the device controls 402 via a device sense bus DSB 411 that is employed by the control node 403 to turn the device 401 on and off, to sense when the device 401 is turned on and off, and to further transparently enable the device 401 to operate independent of the energy consumption management system 400 in a fail-safe mode while at the same time sensing when the device 401 is turned on and turned off in the fail-safe mode. Each of the control nodes 403 maintains control of their respective device 401 and in addition maintains a replicated copy of a global model of a system environment along with a global schedule for actuation of all of the devices 401 in the system 400. Updates to the global model and schedule, along with various sensor, monitor, gateway, configuration, and status messages are broadcast over an energy management network (EMN) 410, which interconnects all of the control nodes 403, and couples these control nodes to optional global sensor nodes 406, optional monitor nodes 409, and an optional gateway node 420. In one embodiment, the EMN 410 may comprise an IEEE 802.15.4 packetized wireless data network as is well understood by those skilled in the art. Alternatively, the EMN 410 may be embodied as an IEEE 802.11 packetized wireless or wired network. In another embodiment, the EMN 410 may comprise a power line modulated network comporting with HOMEPLUG® protocol standards. Other packetized network configurations are additionally contemplated, such as, but not limited to, a BLUETOOTH® low power wireless network. The present inventors note, however, that the present invention is distinguished from conventional "state machine" techniques for resource demand management and control in that only model updates and schedule updates are broadcast over the EMN 410, thus providing a strong advantage according to the present invention in light of network disruption. For the 802.15.4 embodiment, replicated model and schedule copies on each control node 403 along with model and schedule update broadcasts according to the present invention are very advantageous in the presence of noise and multipath scenarios commonly experienced by wireless packetized networks. That is, a duplicate model update message that may be received by one or more nodes 403 does not serve to perturb or otherwise alter effective operation of the system 400.

Zero or more local sensors 404 are coupled to each of the control nodes 403 via a local sensor bus 412, and configuration of each of the local sensors 404 may be different for each one of the devices 401. Examples of local sensors 404 include temperature sensors, flow sensors, light sensors, and other sensor types that may be employed by the control node 403 to determine and model an environment that is local to a particular system device 401. For instance, a temperature sensor 404 may be employed by a control node 403 to sense the temperature local to a particular device 401 disposed as an air-conditioning unit. Another unit may employ local sensors 404 comprising both a temperature and humidity sensor local to a device 401 disposed as an air-conditioning unit. Other examples abound. Other embodiments contemplate collocation of local sensors 404 and device control 402 for a device 401, such as the well-known thermostat.

The system 400 also optionally includes one or more global sensors 405, each of which is coupled to one or more sensor nodes 406 according to the present invention. The global sensors 405 may comprise, but are not limited to, movement sensors, solar radiation sensors, wind sensors, precipitation sensors, humidity sensors, temperature sensors, power meters, and the like. The sensors 405 are configured such that their data is employed to globally affect all modeled environments and schedules. For example, the amount of solar radiation on a facility may impact to each local environment associated with each of the system devices 401, and therefore must be considered when developing a global model of the system environment. In one embodiment, the global model of the system environment is an aggregate of all local models associated with each of the devices, where each of the local models are adjusted based upon the data provided by the global sensors 405.

Each of the global sensors 405 is coupled to a respective sensor node 406 according to the present invention via a global sensor bus (GSB) 413, and each of the sensor nodes 406 are coupled to the EMN 410. Operationally, the sensor nodes 406 are configured to sample their respective global sensor 405 and broadcast changes to the sensor data over the EMN 410 to the control nodes 403 and optionally to the gateway node 420.

The system 400 also optionally includes one or more non-system devices 407, each having associated device control 408 that is coupled to a respective monitor node 409 via a non-system bus (NSB) 414. Each of the monitor nodes 409 is coupled to the EMN 410. Operationally, each monitor node 409 monitors the state of its respective non-system device 407 via its device control 408 to determine whether the non-system device 409 is consuming the managed resource (i.e., turned on) or not (i.e., turned off). Changes to the status of each non-system device 407 are broadcast by its respective monitor node 409 over the EMN 410 to the control nodes 403 and optionally to the gateway node 420. The non-system devices 407 may comprise any type of device that consumes the resource being managed, but which is not controlled by the system 400. One example of such a non-system device 407 is an elevator in a building. The elevator consumes electrical power, but may not be controlled by the system 400 in order to manage energy use. Thus, in one embodiment, consumption of the resource by these non-system devices 407 is employed as a factor during scheduling of the system devices 401 in order to manage and control peak demand of the resource.

Optionally, the gateway node 420 is coupled by any known means to a network operations center (NOC) 421. The NOC 421 many include an occupancy determination system 422, substantially the same as the occupancy determination system 100 described above with reference to FIGS. 1-3. The NOC 421 may also be optionally coupled to a streaming source 440 for purposes of obtaining real time or near real time energy consumption data, outside temperature data, and optional calendar data for the building at a useful time increment. In one embodiment, the time increment is one hour. In another embodiment, the time increment is 15 minutes. In a further embodiment, the time increment is 5 minutes. The energy consumption data may also be provided over the EMN 410 to the gateway node 420 by coupling a facility power meter 430 to one of the global sensors 405. Outside temperature data may also be provided over the EMN 410 in like manner.

In operation, configuration data for the system 400 may be provided by the NOC 421 and communicated to the gateway node 420. Alternatively, configuration data may be provided via the gateway node 420 itself. Typically, the gateway node 420 is collocated with the system 400 whereas the NOC 421 is not collocated and the NOC 421 may be employed to provide configuration data to a plurality of gateway nodes 420 corresponding to a plurality of systems 400. The configuration data may comprise, but is not limited to, device control data such as number of simultaneous devices in operation, device operational priority relative to other devices, percentage of peak load to employ, peak demand profiles related to time of day, and the like.

Thus, as will be described in more detail below, each of the control nodes 403 develops a local environment model that is determined from corresponding local sensors 404. Each local environment model, as changes to the local environment model occur, is broadcast over the EMN 410 to all other control nodes 403. Each of the control nodes 403 thus maintains a global environmental model of the system 400 which, in one embodiment, comprises an aggregation of all of the local environmental models. Each of the global models is modified to incorporate the effect of data provided by the global sensors 105 and by daily occupancy level data determined by the occupancy determination system 422 within the NOC 421. Thus, each identical global model comprises a plurality of local environmental models, each of which has been modified due to the effect of data provided by the global sensors 105 and the daily occupancy level data. It is important to note that the term "environmental" is intended to connote a modeling environment which includes, but is not limited to, the physical environment and occupancy of the facility as a function of time. In one embodiment, the lower energy consumption bound $\zeta(T)$, the normalized occupancy profile component $f(h)$, the marginal energy consumption component $D(T)$, and the daily occupancy level component $\gamma_i$ for the facility are determined by the occupancy determination system 422 and are maintained within the NOC 421. Occupancy update data is periodically transmitted to the EMN 410 for incorporation into the global model.

Each control node 403, as will be described below, additionally comprises a global schedule which, like the global model, is an aggregate of a plurality of local run time schedules, each associated with a corresponding device 401. The global schedule utilizes the global model data in conjunction with configuration data and data provided by the monitor nodes 409, to develop the plurality of local run time schedules, where relative start times, duration times, and duty cycle times are established such that comfort margins associated with each of the local environments are maintained, in one embodiment, via maintaining, advancing (i.e., running early), or deferring (i.e., delaying) their respective start times and durations, and via maintaining, advancing, or deferring their respective duty cycles.

It is noted that the above embodiments according to the present invention determine occupancy of the facility based solely upon energy consumption by the facility and outside temperature. In one embodiment where sufficient training data has been processed by the occupancy determination system 422, occupancy of the facility may be determined exclusively from energy usage data; outside temperature is not required.

The occupancy determination system 422 may selectively determine an occupancy level component $\gamma_i$ for the facility based solely on the calendar data. For example, buildings with known cyclical occupancy level patterns (e.g., office buildings, schools, etc.) only require knowledge of type of day (e.g., Monday, Friday, holiday, weekend, etc.). And since normalized occupancy profile $f(h)$ for the facility has been previously derived from the training data, what is required to update the global model is the predetermined normalized occupancy profile $f(h)$, the occupancy level for the day $\gamma_i$, and the marginal energy component $D(T)$.

Alternatively, for facilities having irregular occupancy level patterns, the occupancy determination system 422 may process real time or near real time energy consumption data to determine an occupancy level component for the day $\gamma_i$ based upon the normalized occupancy profile $f(h)$, the occupancy level for the day $\gamma_i$, and the marginal energy component $D(T)$. For example, the occupancy determination system 422 may process energy consumption data for the first 12 hours of the day, determine an occupancy level component for the day $\gamma_i$, and provide $\gamma_i$ over the EMN 410 to update the global model for control of the energy management system 400 for the remainder of the day.

Figure 5:
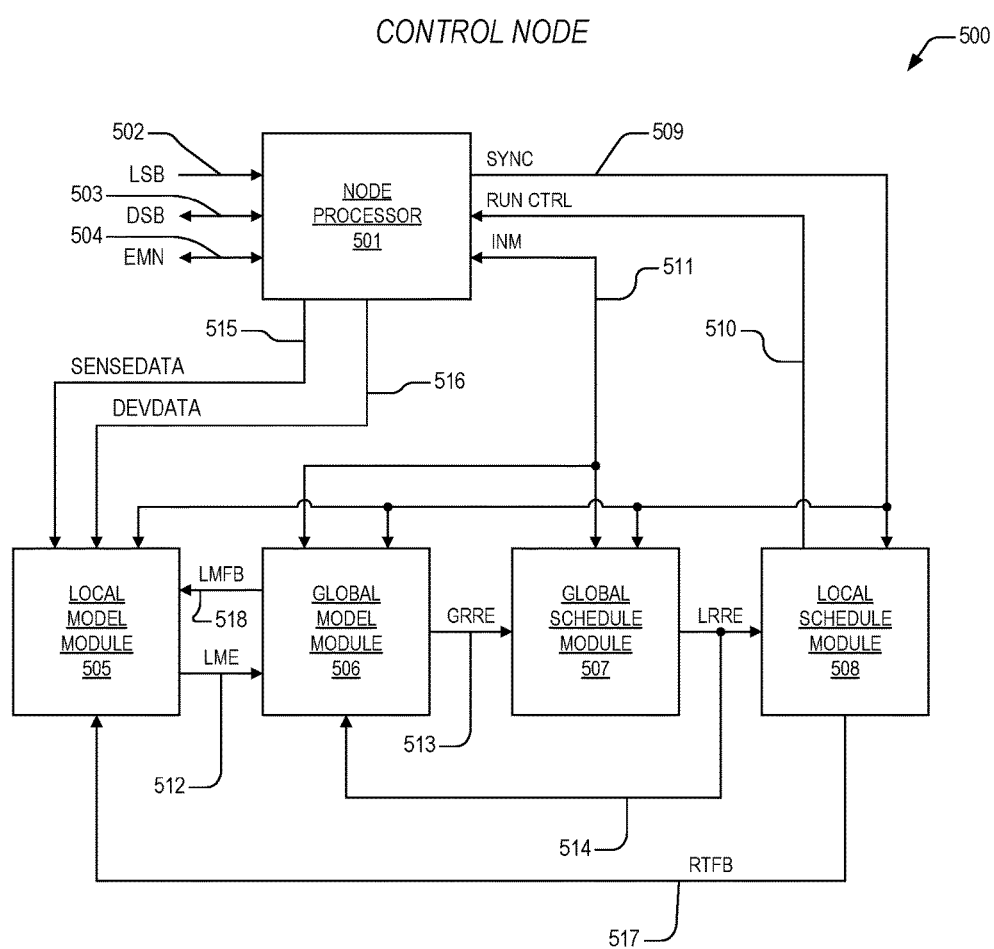
FIG. 5 is a block diagram illustrating a control node according to the present invention.

Referring now to FIG. 5, a block diagram is presented illustrating a control node 500 according to the present invention, such as may be employed within the occupancy based energy management system 400 of FIG. 4. The control node 500 includes a node processor 501 that is coupled to one or more local sensors (not shown) via a local sensor bus (LSB) 502, a device control (not shown) via a device sense bus (DSB) 503, and to an energy management network (EMN) 504 as has been described above with reference to FIG. 4.

The control node 500 also includes a local model module 505 that is coupled to the node processor 501 via a synchronization bus (SYNC) 509, a sensor data bus (SENSEDATA) 515, and a device data bus (DEVDATA) 516. The control node 500 also has a global model module 506 that is coupled to the node processor 501 via SYNC 509 and via an inter-node messaging bus (INM) 511. The global model module 506 is coupled to the local model module 505 via a local model environment bus (LME) 512. The control node 500 further includes a global schedule module 507 that is coupled to the node processor 501 via SYNC 509 and INM 511, and that is coupled to the global model module 506 via a global relative run environment bus (GRRE) 513. The control node 500 finally includes a local schedule module 508 that is coupled to the node processor 501 via SYNC 509 and a run control bus (RUN CTRL) 510. The local schedule module 508 is also coupled to the global schedule module 507 via a local relative run environment bus (LRRE) 514. LRRE 514 is also coupled to the global model module 506. In addition, a run time feedback bus (RTFB) 517 couples the local schedule module 508 to the local model module 505.

The node processor 501, local model module 505, global model module 506, global schedule model 507, and local schedule model 508=according to the present invention are configured to perform the operations and functions as will be described in further detail below. The node processor 501 local model module 505, global model module 506, global schedule model 507, and local schedule model 508 each comprises logic, circuits, devices, or microcode (i.e., micro instructions or native instructions), or a combination of logic, circuits, devices, or microcode, or equivalent elements that are employed to perform the operations and functions described below. The elements employed to perform these operations and functions may be shared with other circuits, microcode, etc., that are employed to perform other functions within the control node 500. According to the scope of the present application, microcode is a term employed to refer to one or more micro instructions.

In operation, synchronization information is received by the node processor 501. In one embodiment, the synchronization information is time of day data that is broadcast over the EMN 504. In an alternative embodiment, a synchronization data receiver (not shown) is disposed within the node processor 501 itself and the synchronization data includes, but is not limited to, atomic clock broadcasts, a receivable periodic synchronization pulse such as an amplitude modulated electromagnetic pulse, and the like. The node processor 501 is further configured to determine and track relative time for purposes of tagging events and the like based upon reception of the synchronization data. Preferably, time of day is employed, but such is not necessary for operation of the system.

The node processor 501 provides periodic synchronization data via SYNC 509 to each of the modules 505-508 to enable the modules 505-508 to coordinate operation and to mark input and output data accordingly. The node processor 501 also periodically monitors data provided by the local sensors via LSB 502 and provides this data to the local model module 505 via SENSEDATA 515. The node processor 501 also monitors the DSB 503 to determine when an associated device (not shown) is turned on or turned off. Device status is provided to the local model module 505 via DEVDATA 516. The node processor 501 also controls the associated device via the DSB 503 as is directed via commands over bus RUN CTRL 510. The node processor 501 further transmits and receives network messages over the EMN 504. Received message data is provided to the global model module 506 or the global schedule model 507 as appropriate over bus INM 511. Likewise, both the global model module 506 and the global schedule model 507 may initiate EMN messages via commands over bus INM 511. These EMN messages primarily include, but are not limited to, broadcasts of global model updates and global schedule updates. System configuration message data as described above is distributed via INM 511 to the global schedule module 507.

Periodically, in coordination with data provided via SYNC 509, the local model module employs sensor data provided via SENSEDATA 515 in conjunction with device actuation data provided via DEVDATA 516 to develop, refine, and update a local environmental model which comprises, in one embodiment, a set of descriptors that describe a relative time dependent flow of the local environment as a function of when the associated device is on or off. For example, if the device is an air conditioning unit and the local sensors comprise a temperature sensor, then the local model module 505 develops, refines, and updates a set of descriptors that describe a local temperature environment as a relative time function of the data provided via SYNC 509, and furthermore as a function of when the device is scheduled to run and the parameters associated with the scheduled run, which are received from the local schedule module 508 via RTFB 517. This set of descriptors is provided to the global model module 506 via LME 512. However, it is noted that these descriptors are updated and provided to LME 512 only when one or more of the descriptors change to the extent that an error term within the local model module 505 is exceeded. In addition to the descriptors, data provided on LME 512 by the local model module includes an indication of whether the descriptors accurately reflect the actual local environment, that is, whether the modeled local environment is within an acceptable error margin when compared to the actual local environment. When the modeled local environment exceeds the acceptable error margin when compared to the actual local environment, then the local model module 505 indicates that its local environment model is inaccurate over LME 512, and the energy management system may determine to allow the associated device to run under its own control in a fail-safe mode. For instance, if occupancy of a given local area remains consistent, then a very accurate model of the local environment will be developed over a period of time, and updates of the descriptors 512 will decrease in frequency, thus providing advantages when EMN 504 is disrupted. It is noted that the error term will decrease substantially in this case. However, consider a stable local environment model that is continually perturbed by events that cannot be accounted for in the model, such as impromptu gatherings of many people. In such a case the error term will be exceeded, thus causing the local model module 505 to indicate over LME 512 that its local environment model is inaccurate. In the case of a system comprising air conditioning units, it may be determined to allow the associated unit to run in fail-safe mode, that is, under control of its local thermostat. Yet, advantageously, because all devices continue to use their replicated copies of global models and global schedules, the devices continue to operate satisfactorily in the presences of disruption and network failure for an extended period of time. Additionally, if model error over time is known, then all devices in the network can utilize pre-configured coordination schedules, effectively continuing coordination over an extended period of time, in excess of the models ability to stay within a known margin of error. Furthermore, it can be envisioned that devices without a EMN 504, utilizing some externally sensible synchronization event, and with known model environments, could perform coordination sans the EMN 504.

The local model module 505, in addition to determining the above noted descriptors, also maintains values reflecting accuracy of the local sensors, such as hysteresis of a local thermostat, and accounts for such in determining the descriptors. Furthermore, the local model module 505 maintains and communicates via LME 512 acceptable operation margin data to allow for advancement or deferral of start times and durations, and increase or decrease of duty cycles. In an air conditioning or heating environment, the acceptable operation margin data may comprise an upper and lower temperature limit that is outside of the hysteresis (set points) of the local temperature sensor, but that is still acceptable from a human factors perspective in that it is not noticeable to a typical person, thus not adversely impacting that person's productivity. In addition, the local model module 505 may maintain values representing a synthesized estimate of a variable (for example, temperature). In another embodiment, the local model module 505 may maintain synthesized variables representing, say, comfort, which are a function of a combination of other synthesized variables including, but not limited to, temperature, humidity, amount of light, light color, and time of day.

In one embodiment, the descriptors comprise one or more coefficients and an offset associated with a linear device on-state equation and one or more coefficients and intercept associated with a linear device off-state equation. Other equation types are contemplated as well to include second order equations, complex coefficients, or lookup tables in the absence of equation-based models. What is significant is that the local model module generates and maintains an acceptable description of its local environment that is relative to a synchronization event such that the global model module 506 can predict the local environment as seen by the local model module.

The global model module 506 receives the local descriptors via LME 512 and stores this data, along with all other environments that are broadcast over the EMN 504 and received via the INM 511. In addition, the global model module 506 adjusts its corresponding local environment entry to take into account sensor data from global sensors (e.g., motion sensors, solar radiation sensors) and occupancy components determined by the occupancy determination system which are received over the EMN 504 and provided via the INM 511. An updated local entry in the global model module 506 is thus broadcast over the EMN 504 to all other control nodes 500 in the system and is additionally fed back to the local model module 505 to enable the local model module 505 to adjust its local model to account for the presence of global sensor and occupancy component data.

The global model module 506 provides all global model entries to the global schedule module 507 via GRRE 513. The global schedule module 507 employs these entries to determine when and how long to actuate each of the devices in the system. In developing a global device schedule, the global schedule module utilizes the data provided via GRRE 513, that is, aggregated adjusted local models for the system, along with system configuration data as described above which is resident at installation or which is provided via a broadcast over the EMN 504 (i.e., a NOC-initiated message over the gateway node). The global device actuation schedule refers to a schedule of operation relative to the synchronization event and is broadcast over the DCN 504 to all other control nodes 500. In addition, the device actuation schedule associated with the specific control node 500 is provided over LRRE 514 to both the local schedule module 508 and the local model module 505, for this data directs if and when the device associated with the specific control node 500 will run. It is noted that the global schedule module 507 operates substantially to optimize energy usage of the system by advancing or deferring device start times and increasing or decreasing device duty cycles in accordance with device priorities. The value by which a time is advanced or deferred and the amount of increase or decrease to a duty cycle is determined by the global schedule module 507 such that higher priority devices are not allowed to operate outside of their configured operational margin. In addition, priorities, in one embodiment, are dynamically assigned by the global schedule module 507 based upon the effect of the device's timing when turned on. Other mechanisms are contemplated as well for dynamically assigning device priority within the system.

The local schedule module 508 directs the associated device to turn on and turn off at the appropriate time via commands over RUN CTRL 510, which are processed by the node processor 501 and provided to the device control via DSB 503.

Figure 6:
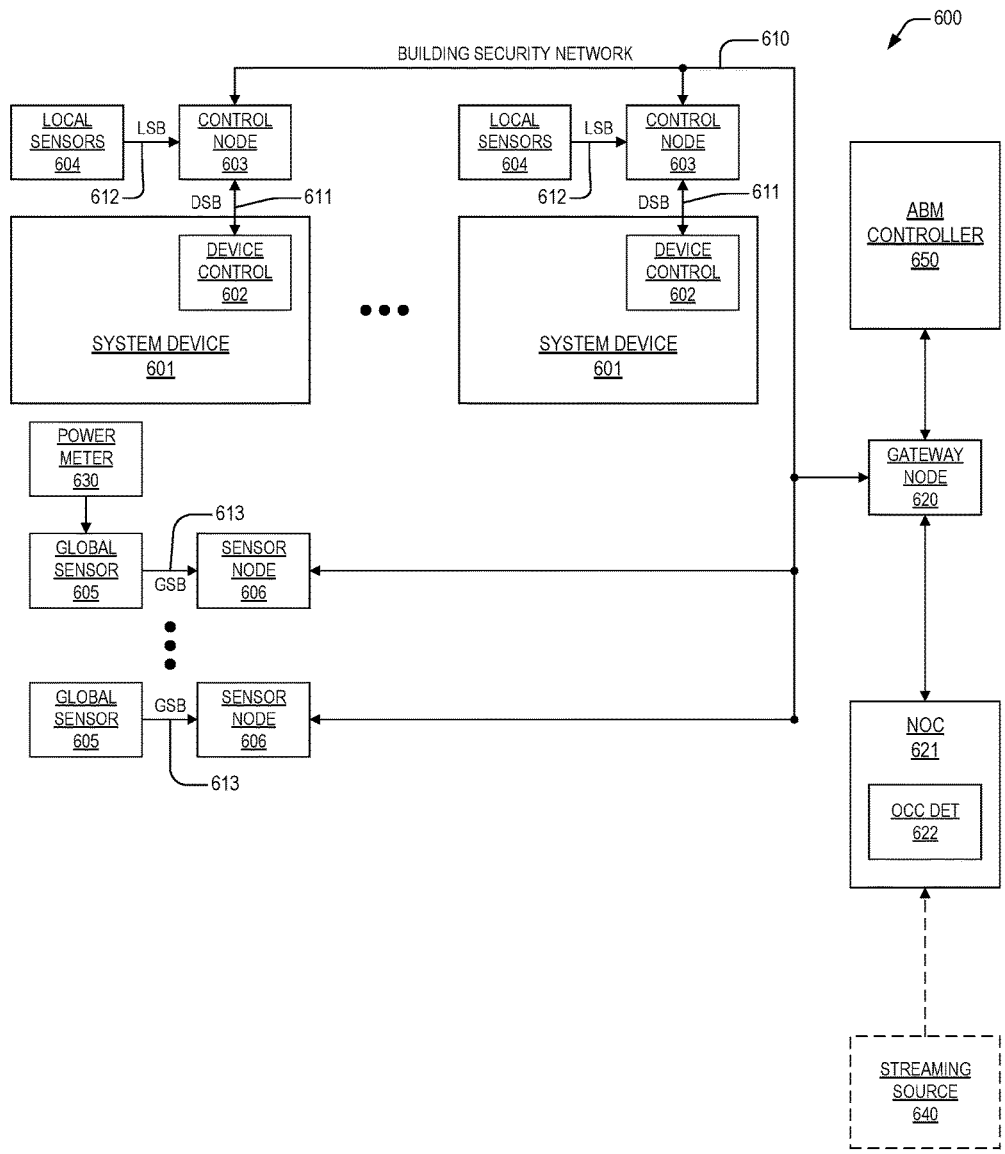
FIG. 6 is a block diagram detailing an occupancy based building security mechanism according to the present invention.

Referring to FIG. 6, a block diagram is presented detailing an occupancy based building security system 600 according to the present invention. The occupancy based building security system 600 may include a plurality of system devices 601, each of which is managed and controlled within the system 600 for purposes of active security control of a facility. In one embodiment, the system devices 601 may include, but are not limited to, lighting controls, alarms, door locks, window locks, controllable access devices (e.g., gates, doors, etc.), cameras, signage, and communication links. The present inventors specifically note that the system 600 contemplated herein is intended to be preferably employed to control any type of resource consuming device 601 such as the units noted above, and also any other device 601 that is capable of being actuated in order to actively manage the devices 601 within or around the facility in order to achieve a desired level of security. It is also noted that, in one embodiment, the devices 601 are powered by electricity via A/C mains, battery power, or both sources. It is further noted that the term "facility" is not to be restricted to construe a brick and mortar structure, but may also comprehend any form of interrelated system 600 of devices 601 whose performance can be modeled and whose actuations can be scheduled and controlled in order to manage access, control physical market, protect valuable assets, and detect and deter intruders.

Having noted the above, each of the devices 601 includes a device control 602 that operates to actuate the device 601 according to its intended function (e.g., open/close doors and windows, lock/unlock, turn lighting on and off, display security markings on signage, etc.). Although implied by block diagram, the present inventors note that the device control 602 also may not be disposed within the device 601, and the device control 602 may not be collocated with the device 601 as, for example, in the case of a remote control as is employed by an automated building monitor controller 650.

A control node 603 according to the present invention is coupled to each of the device controls 602 via a device sense bus DSB 611 that is employed by the control node 603 to actuate the device 601, to sense when the device 601 is actuated or not, and to further transparently enable the device 601 to operate independent of the building security system 600 in a fail-safe mode while at the same time sensing when the device 601 is actuated in the fail-safe mode. Each of the control nodes 603 maintains control of their respective device 601 and in addition maintains a replicated copy of a global model of a system security environment along with a global schedule for actuation of all of the devices 601 in the system 600. Updates to the global model and schedule, along with various sensor, monitor, gateway, configuration, and status messages are broadcast over a building security network (BSN) 610, which interconnects all of the control nodes 603, and couples these control nodes to optional global sensor nodes 606, optional monitor nodes 609, and an optional gateway node 620. In one embodiment, the BSN 610 may comprise an IEEE 802.15.4 packetized wireless data network as is well understood by those skilled in the art. Alternatively, the BSN 610 may be embodied as an IEEE 802.11 packetized wireless or wired network. In another embodiment, the BSN 610 may comprise a power line modulated network comporting with HOMEPLUG® protocol standards. Other packetized network configurations are additionally contemplated, such as, but not limited to, a BLUETOOTH® low power wireless network. The present inventors note, however, that the present invention is distinguished from conventional "state machine" techniques for building security management and control in that only model updates and schedule updates are broadcast over the BSN 610, thus providing a strong advantage according to the present invention in light of network disruption. For the 802.15.4 embodiment, replicated model and schedule copies on each control node 603 along with model and schedule update broadcasts according to the present invention are very advantageous in the presence of noise and multipath scenarios commonly experienced by wireless packetized networks. That is, a duplicate model update message that may be received by one or more nodes 603 does not serve to perturb or otherwise alter effective operation of the system 600.

Zero or more local sensors 604 are coupled to each of the control nodes 603 via a local sensor bus 612, and configuration of each of the local sensors 604 may be different for each one of the devices 601. Examples of local sensors 604 include motion sensors, infrared sensors, glass break sensors, video sensors, and other sensor types that may be employed by the control node 603 to determine and model an environment that is local to a particular system device 601. For instance, a motion sensor 604 may be employed by a control node 603 to sense motion local to a particular device 601 disposed as a warning sign. Other embodiments contemplate collocation of local sensors 604 and device control 602 for a device 601.

The system 600 also optionally includes one or more global sensors 605, each of which is coupled to one or more sensor nodes 606 according to the present invention. The global sensors 605 may comprise, but are not limited to, movement sensors, card readers, biometric sensors, humidity sensors, temperature sensors, flood sensors, power meters 630, and the like. The sensors 605 are configured such that their data is employed to globally affect all modeled environments and schedules. In one embodiment, the global model of the system environment is an aggregate of all local models associated with each of the devices, where each of the local models are adjusted based upon the data provided by the global sensors 605.

Each of the global sensors 605 is coupled to a respective sensor node 606 according to the present invention via a global sensor bus (GSB) 613, and each of the sensor nodes 606 are coupled to the BSN 610. Operationally, the sensor nodes 606 are configured to sample their respective global sensor 605 and broadcast changes to the sensor data over the BSN 610 to the control nodes 603 and optionally to the gateway node 620.

Optionally, the gateway node 620 is coupled by any known means to a network operations center (NOC) 621. The NOC 621 many include an occupancy determination system 622, substantially the same as the occupancy determination system 100 described above with reference to FIGS. 1-4. The NOC 621 may also be optionally coupled to a streaming source 640 for purposes of obtaining real time or near real time energy consumption data, outside temperature data, and optional calendar data for the building at a useful time increment. In one embodiment, the time increment is one hour. In another embodiment, the time increment is 15 minutes. In a further embodiment, the time increment is 5 minutes. The energy consumption data may also be provided over the BSN 610 to the gateway node 620 by coupling the facility power meter 630 to one of the global sensors 605. Outside temperature data may also be provided over the EMN 610 in like manner. The automated building security monitor controller 650 may be coupled to the gateway node 620, as shown in the block diagram, or it may be directly coupled to the BSN 610.

In operation, configuration data for the system 600 may be provided by the controller 650 or by the NOC 621 and communicated to the gateway node 620. Alternatively, configuration data may be provided via the gateway node 620 itself. Typically, the gateway node 620 is collocated with the system 600 whereas the NOC 621 is not collocated and the NOC 621 may be employed to provide configuration data to a plurality of gateway nodes 620 corresponding to a plurality of systems 600. The configuration data may comprise, but is not limited to, device control data, device operational priority relative to other devices 601, times and schedules for access control, visitor lists, temporary access restrictions, and the like.

Thus, as will be described in more detail below, each of the control nodes 603 develops a local security model that is determined from corresponding local sensors 604. Each local security model, as changes to the local security model occur, is broadcast over the BSN 610 to all other control nodes 603. Each of the control nodes 603 thus maintains a global security model of the system 600 which, in one embodiment, comprises an aggregation of all of the local security models. Each of the global models is modified to incorporate the effect of data provided by the global sensors 105 and by daily occupancy level data determined by the occupancy determination system 622 within the NOC 621. Thus, each identical global model comprises a plurality of local security models, each of which has been modified due to the effect of data provided by the global sensors 105 and the daily occupancy level data. It is important to note that the term "security" is intended to connote a modeling environment which includes, but is not limited to, the physical environment and occupancy of the facility and surrounding areas as a function of time. In one embodiment, the lower energy consumption bound $f(T)$, the normalized occupancy profile component $f(h)$, the marginal energy consumption component $D(T)$, and the daily occupancy level component $\gamma_i$ for the facility are determined by the occupancy determination system 622 and are maintained within the NOC 621. Occupancy update data is periodically transmitted to the EMN 610 for incorporation into the global model.

Each control node 603, as will be described below, additionally comprises a global schedule which, like the global model, is an aggregate of a plurality of local run time schedules, each associated with a corresponding device 601. The global schedule utilizes the global model data in conjunction with configuration data and data provided by the monitor nodes 609, to develop the plurality of local run time schedules, where relative device actuation times are established such that security provisions associated with each of the local security environments are maintained, in one embodiment, via maintaining, advancing (i.e., running early), or deferring (i.e., delaying) their respective actuation times and durations, and via maintaining, advancing, or deferring their respective duty cycles.

It is noted that the above embodiments according to the present invention determine occupancy levels of the facility based solely upon energy consumption by the facility and outside temperature. In one embodiment where sufficient training data has been processed by the occupancy determination system 622, occupancy of the facility may be determined exclusively from energy usage data; outside temperature is not required.

The occupancy determination system 622 may selectively determine an occupancy level component $\gamma_i$ for the facility based solely on the calendar data. For example, buildings with known cyclical occupancy level patterns (e.g., office buildings, schools, etc.) only require knowledge of type of day (e.g., Monday, Friday, holiday, weekend, etc.). And since normalized occupancy profile $f(h)$ for the facility has been previously derived from the training data, what is required to update the global model is the predetermined normalized occupancy profile $f(h)$, the occupancy level for the day $\gamma_i$, and the marginal energy component $D(T)$.

Alternatively, for facilities having irregular occupancy level patterns, the occupancy determination system 622 may process real time or near real time energy consumption data to determine an occupancy level component for the day $\gamma_i$ based upon the normalized occupancy profile $f(h)$, the occupancy level for the day $\gamma_i$, and the marginal energy component $D(T)$. For example, the occupancy determination system 622 may process energy consumption data for the first 12 hours of the day, determine an occupancy level component for the day $\gamma_i$, and provide $\gamma_i$, over the EMN 610 to update the global model for control of the building security system 600 for the remainder of the day.

Figure 7:
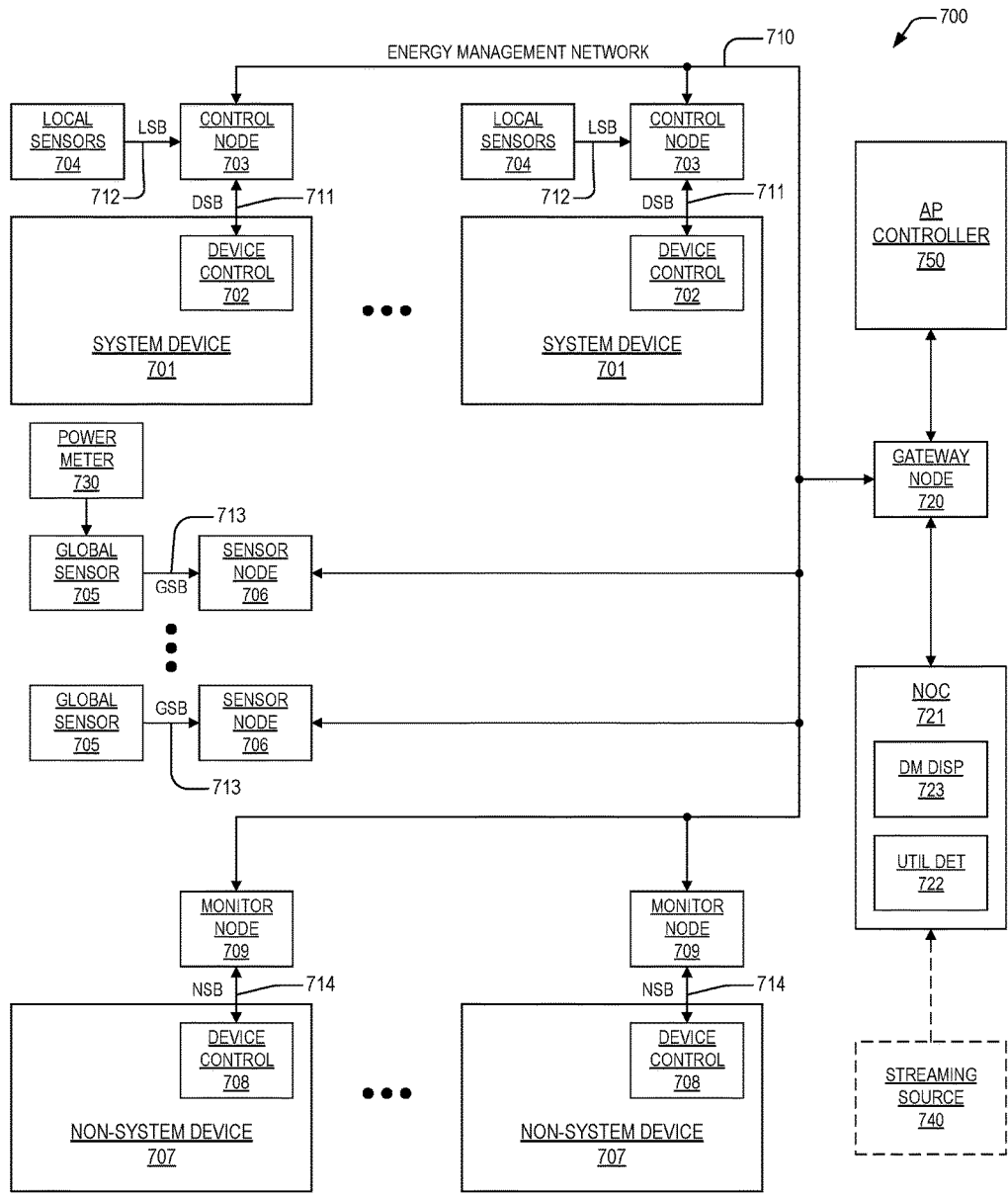
FIG. 7 is a block diagram illustrating an energy management system according to the present invention that employs estimated resource utilization.

Turning to FIG. 7, a block diagram is presented illustrating an energy management system 700 according to the present invention that employs estimated resource utilization. Such a system may be employed to manage and control consumption of a resource (e.g. electricity, gas, etc.) in an environment where consumption of the resource is primarily driven by the utilization of energy consuming equipment, devices, and the like, as opposed to the number of living beings within a facility. Examples of such environments, as noted above, include, but are not limited to, steel mills, refineries, aggregate plants, server farms, etc. The energy management system 700 may include a plurality of system devices 701, each of which is managed and controlled within the system 700 for purposes of energy consumption control in order to manage peak resource demand, time of day use, or energy reduction targets. In one embodiment, the system devices 701 may include, but are not limited to, electric motors, pumps, fans, smelting ovens, burners, refrigeration units, and rock crushers that are disposed within a building or other facility, and the resource that is managed may comprise electrical power. The present inventors specifically note that the system 700 contemplated herein is intended to be preferably employed to control any type of resource consuming device 701 such as the units noted above, and also including, but not limited to, heat exchangers, motors, generators, power supplies, light fixtures, furnaces, or any other device that is capable of being duty-cycle actuated in order to control use of a corresponding resource, but which is also capable, in one embodiment, of maintaining a desired level of performance, typically a production level, by advancing or deferring actuation times and increasing or decreasing duty cycles in coordination with other associated devices 701. For purposes of the present application, the term "production level" may also connote an acceptable level of performance for a device 701 or machine that satisfies overall constraints of an associated system 700. The present inventors also note that the present invention comprehends any form of consumable resource including, but not limited to, electrical power, natural gas, fossil fuels, water, and nuclear power. As noted above, present day mechanisms are in place by energy suppliers to levy peak demand and time of use charges for the consumption of electrical power by an industrial consumer and, going forward, examples will be discussed in terms relative to the supply, consumption, and demand coordination of electrical power for purposes only of teaching the present invention in well-known subject contexts. However, it is noted that any of the examples discussed herein may be also embodied to employ alternative devices 701 and resources as noted above for the coordination of consumption of those resources within a system 700. It is further noted that the term "facility" is not to be restricted to construe a brick and mortar structure, but may also comprehend any form of interrelated system 700 of devices 701 whose performance can be modeled and whose actuations can be scheduled and controlled in order to control and manage the demand of a particular resource.

Having noted the above, each of the devices 701 includes a device control 702 that operates to turn the device 701 on, thus consuming a resource, and off, thus not consuming the resource. When the device 701 is off, a significant amount of the resource is consumed, and thus a device that is off does not substantially contribute to overall cumulative use of the resource. Although implied by block diagram, the present inventors note that the device control 702 also may not be disposed within the device 701, and the device control 702 may not be collocated with the device 701 as, for example, in the case of a remote control.

A control node 703 according to the present invention is coupled to each of the device controls 702 via a device sense bus DSB 711 that is employed by the control node 703 to turn the device 701 on and off, to sense when the device 701 is turned on and off, and to further transparently enable the device 701 to operate independent of the energy consumption management system 700 in a fail-safe mode while at the same time sensing when the device 701 is turned on and turned off in the fail-safe mode. Each of the control nodes 703 maintains control of their respective device 701 and in addition maintains a replicated copy of a global model of a system environment along with a global schedule for actuation of all of the devices 701 in the system 700. Updates to the global model and schedule, along with various sensor, monitor, gateway, configuration, and status messages are broadcast over an energy management network (EMN) 710, which interconnects all of the control nodes 703, and couples these control nodes to optional global sensor nodes 706, optional monitor nodes 709, and an optional gateway node 720. In one embodiment, the EMN 710 may comprise an IEEE 802.15.4 packetized wireless data network as is well understood by those skilled in the art. Alternatively, the EMN 710 may be embodied as an IEEE 802.11 packetized wireless or wired network. In another embodiment, the EMN 710 may comprise a power line modulated network comporting with HOMEPLUG® protocol standards. Other packetized network configurations are additionally contemplated, such as, but not limited to, a BLUETOOTH® low power wireless network. The present inventors note, however, that the present invention is distinguished from conventional "state machine" techniques for resource demand management and control in that only model updates and schedule updates are broadcast over the EMN 710, thus providing a strong advantage according to the present invention in light of network disruption. For the 802.15.4 embodiment, replicated model and schedule copies on each control node 703 along with model and schedule update broadcasts according to the present invention are very advantageous in the presence of noise and multipath scenarios commonly experienced by wireless packetized networks. That is, a duplicate model update message that may be received by one or more nodes 703 does not serve to perturb or otherwise alter effective operation of the system 700.

Zero or more local sensors 704 are coupled to each of the control nodes 703 via a local sensor bus 712, and configuration of each of the local sensors 704 may be different for each one of the devices 701. Examples of local sensors 704 include temperature sensors, flow sensors, light sensors, and other sensor types that may be employed by the control node 703 to determine and model an environment that is local to a particular system device 701. For instance, a temperature sensor 704 may be employed by a control node 703 to sense the temperature local to a particular device 701 disposed as a refrigeration unit. Another unit may employ local sensors 704 comprising both a temperature and humidity sensor local to a device 701 disposed as an oven. Other examples abound. Other embodiments contemplate collocation of local sensors 704 and device control 702 for a device 701.

The system 700 also optionally includes one or more global sensors 705, each of which is coupled to one or more sensor nodes 706 according to the present invention. The global sensors 705 may comprise, but are not limited to, movement sensors, wind sensors, dust sensors, precipitation sensors, humidity sensors, temperature sensors, power meters 750, and the like. The sensors 705 are configured such that their data is employed to globally affect all modeled environments and schedules. For example, the amount of precipitation on a facility may impact each local environment associated with each of the system devices 701, and therefore must be considered when developing a global model of the system environment. In one embodiment, the global model of the system environment is an aggregate of all local models associated with each of the devices, where each of the local models are adjusted based upon the data provided by the global sensors 705.

Each of the global sensors 705 is coupled to a respective sensor node 706 according to the present invention via a global sensor bus (GSB) 713, and each of the sensor nodes 706 are coupled to the EMN 710. Operationally, the sensor nodes 706 are configured to sample their respective global sensor 705 and broadcast changes to the sensor data over the EMN 710 to the control nodes 703 and optionally to the gateway node 720.

The system 700 also optionally includes one or more non-system devices 707, each having associated device control 708 that is coupled to a respective monitor node 709 via a non-system bus (NSB) 714. Each of the monitor nodes 709 is coupled to the EMN 710. Operationally, each monitor node 709 monitors the state of its respective non-system device 707 via its device control 708 to determine whether the non-system device 709 is consuming the managed resource (i.e., turned on) or not (i.e., turned off). Changes to the status of each non-system device 707 are broadcast by its respective monitor node 709 over the EMN 710 to the control nodes 703 and optionally to the gateway node 720. The non-system devices 707 may comprise any type of device that consumes the resource being managed, but which is not controlled by the system 700. One example of such a non-system device 707 is an elevator in a building. The elevator consumes electrical power, but may not be controlled by the system 700 in order to manage energy use. Thus, in one embodiment, consumption of the resource by these non-system devices 707 is employed as a factor during scheduling of the system devices 701 in order to manage and control peak demand and time of use of the resource.

Optionally, the gateway node 720 is coupled by any known means to a network operations center (NOC) 721. The NOC 721 many include a demand management dispatch element 723 and a utilization determination system 722. The utilization determination system is substantially the same as the occupancy determination system 100 described above with reference to FIGS. 1-3, but rather than determining occupancy (i.e., the level of living beings) of the facility based exclusively on energy consumption and outside temperature, utilization of the devices 701, 707 within the facility is determined. In terms of the embodiment of FIG. 7, "occupancy" of the facility may be construed as percent utilization of the devices 701, 707. The NOC 721 may also be optionally coupled to a streaming source 740 for purposes of obtaining real time or near real time energy consumption data, outside temperature data, and optional calendar data for the building at a useful time increment. In one embodiment, the time increment is one hour. In another embodiment, the time increment is 15 minutes. In a further embodiment, the time increment is 5 minutes. The energy consumption data may also be provided over the EMN 710 to the gateway node 720 by coupling a facility power meter 730 to one of the global sensors 705. Outside temperature data may also be provided over the EMN 710 in like manner.

In operation, configuration data for the system 700 may be provided by an automated production controller 750 or by the NOC 721 and communicated to the gateway node 720. Alternatively, configuration data may be provided via the gateway node 720 itself. Typically, the gateway node 720 is collocated with the system 700 whereas the NOC 721 is not collocated and the NOC 721 may be employed to provide configuration data to a plurality of gateway nodes 720 corresponding to a plurality of systems 700. The configuration data may comprise, but is not limited to, device control data such as number of simultaneous devices in operation, device operational priority relative to other devices, percentage of peak load to employ, peak demand profiles related to time of day, production quotas for each day, and the like.

Thus, as will be described in more detail below, each of the control nodes 703 develops a local environment model that is determined from corresponding local sensors 704. Each local environment model, as changes to the local environment model occur, is broadcast over the EMN 710 to all other control nodes 703. Each of the control nodes 703 thus maintains a global environmental model of the system 700 which, in one embodiment, comprises an aggregation of all of the local environmental models. Each of the global models is modified to incorporate the effect of data provided by the global sensors 105 and by daily resource utilization level data determined by the utilization determination system 722 within the NOC 721. Thus, each identical global model comprises a plurality of local environmental models, each of which has been modified due to the effect of data provided by the global sensors 105 and the daily utilization level data. It is important to note that the term "environmental" is intended to connote a modeling environment which includes, but is not limited to, the physical environment and utilization of the resource by devices 701, 707 within the facility as a function of time. In one embodiment, the lower energy consumption bound $\zeta(T)$, the normalized occupancy profile component $f(h)$, the marginal energy consumption component $D(T)$, and the daily occupancy level component $\gamma_i$ for the facility are determined by the utilization determination system 722 and are maintained within the NOC 721, where "occupancy" in the context of this embodiment equates to utilization of the resource by the devices 701, 707. Utilization update data is periodically transmitted to the EMN 710 for incorporation into the global model.

Each control node 703, as will be described below, additionally comprises a global schedule which, like the global model, is an aggregate of a plurality of local run time schedules, each associated with a corresponding device 701. The global schedule utilizes the global model data in conjunction with configuration data and data provided by the monitor nodes 709, to develop the plurality of local run time schedules, where relative start times, duration times, and duty cycle times are established such that comfort margins associated with each of the local environments are maintained, in one embodiment, via maintaining, advancing (i.e., running early), or deferring (i.e., delaying) their respective start times and durations, and via maintaining, advancing, or deferring their respective duty cycles.

It is noted that the above embodiments according to the present invention determine utilization of the resource by devices 701, 707 within the facility based solely upon energy consumption by the facility and outside temperature. In one embodiment where sufficient training data has been processed by the utilization determination system 722, resource utilization by the facility may be determined exclusively from energy usage data; outside temperature is not required.

The demand management dispatch element 723 may be configured to provide demand response program or time of use dispatches to the EMN 710 which are incorporated into the global model for purposes of scheduling equipment operation to, in one embodiment, achieve resource utilization constraints while maintaining desired production levels. In another embodiment, the dispatches are incorporated into the global model for purposes of scheduling equipment operation to minimize resource cost of consumption while maintaining desired production levels.

The utilization determination system 722 may selectively determine a utilization level component $\gamma_i$ for the facility based solely on the calendar data. Since a normalized utilization profile $f(h)$ for the facility has been previously derived from the training data, what is required to update the global model is the predetermined normalized utilization profile $f(h)$, the utilization level for the day $\gamma_i$, and the marginal energy component $D(T)$.

Alternatively, for facilities having irregular occupancy level patterns, the utilization determination system 722 may process real time or near real time energy consumption data to determine a utilization level component for the day $\gamma_i$ based upon the normalized utilization profile $f(h)$, the utilization level for the day $\gamma_i$, and the marginal energy component $D(T)$. For example, the utilization determination system 722 may process energy consumption data for the first 12 hours of the day, determine a utilization level component for the day $\gamma_i$, and provide $\gamma_i$ over the EMN 710 to update the global model for control of the energy management system 700 for the remainder of the day.

Figure 8:
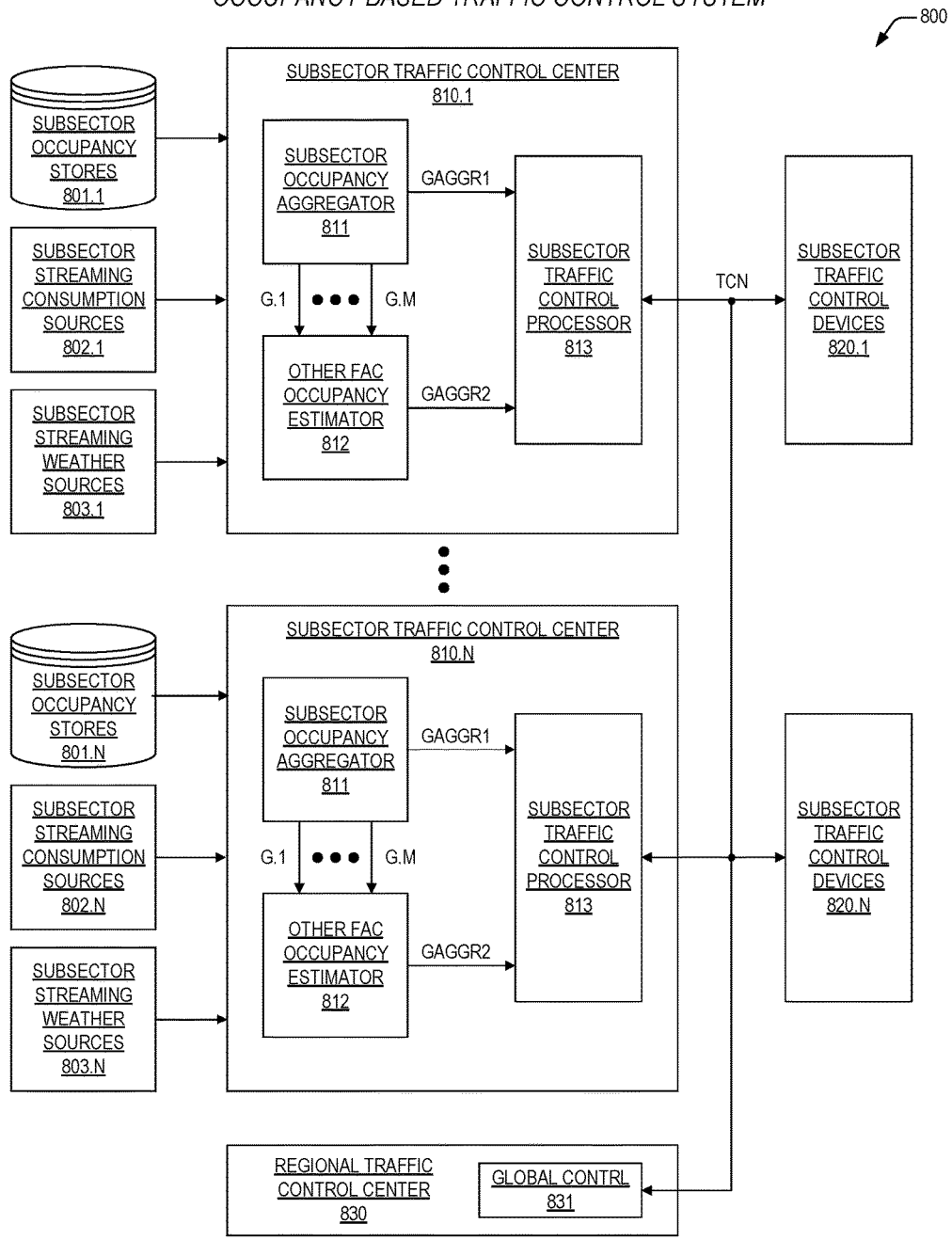
FIG. 8 is a block diagram depicting an occupancy based traffic control system according to the present invention.

Referring now to FIG. 8, a block diagram is presented depicting an occupancy based traffic control system 800 according to the present invention. The traffic control system 800 may include one or more subsector traffic control centers 810.1-810.N, coupled together via a conventional wired or wireless traffic control network MCN for purposes of communication of data and control of subsector traffic control devices 820.1-820.N, which are also coupled to the MCN. A regional traffic control center 830 is also coupled to the MCN. Each of the subsector traffic control centers 810.1-810.N are coupled to subsector occupancy stores 801.1-801-N, subsector consumption streaming sources 802.1-802.N, and subsector weather streaming sources 803.1-803.N. Each of the subsector traffic control centers 810.1-810.N may include a subsector occupancy aggregator 811 that is coupled to an other facility occupancy estimator 812 via one or more gamma buses G.1-G.M. The subsector occupancy aggregator 811 is coupled to a subsector traffic control processor 813 by a first aggregate gamma bus GAGGR1, and the other facility occupancy estimator 812 is coupled to the subsector traffic control processor 813 by a second aggregate gamma bus GAGGR2. Each of the traffic control processors 813 controls a corresponding subsector traffic control device 820.1-820.N over the MCN. The regional traffic control center 830 may include a global control element 831.

The traffic control centers 810.1-810.N, 830 may comprise hardware, or a combination of hardware and software, configured to perform the functions described hereinbelow. In one embodiment, traffic control centers 810.1-810.N, 830 may each comprise a microprocessor or other suitable central processing unit (CPU) (not shown) coupled to a transitory random access memory (not shown) and/or a non-transitory read-only memory (not shown) within which application programs (i.e., software) are disposed that, when executed by the microprocessor/CPU, perform the functions described hereinbelow. The occupancy stores 801.1-801.N may be disposed as conventional transitory or non-transitory data storage mechanisms and the buses G.1-G.M, GAGGR1, GAGGR2 may comprise conventional wired or wireless technology buses for transmission and reception of data including, but not limited to, direct wired (e.g., SATA), cellular, BLUETOOTH®, Wi-Fi, Ethernet, and the internet. The streaming sources 802.1-802.N, 803.1-803.N may comprise conventional wired or wireless technology buses as noted above for transmission and reception of data. The subsector traffic control devices 820.1-820.N may comprise, but are not limited to, street lights, controllable signage, video cameras, market routing devices (e.g., high occupancy vehicle lane gates, etc.), and controllable barriers.

The present inventors have noted that, in addition to the embodiments disclosed above, application of energy based occupancy determination is very useful for augmenting conventional traffic control techniques within metropolitan areas having a high density of office buildings, school, hospitals, and like facilities. Accordingly, in operation, the regional traffic control center 830 provides daily configuration data to each of the subsector traffic control centers 810.1-810.N, where each of the subsector traffic control centers 810.1-810.N are configured to control pedestrian and automotive traffic control devices 820.1-810.N for corresponding geographic subsectors within a region. Each of the corresponding geographic subsectors may include a one or more buildings corresponding to one or more building types (e.g., small office building, medium office building, hospital, school, etc.). A portion of the one or more buildings corresponding to the one or more building types may be configured such that their energy consumption is available via a corresponding subsector streaming consumption source 802.1-802.N in real time or near real time at intervals consistent with those discussed above for determining and employing, for each of the portion of the one or more buildings corresponding to the one or more building types, occupancy components that include an occupancy level component for the day $\gamma_i$, a normalized occupancy profile $f(h)$, and a marginal energy component D(T). The noted occupancy components may be determined and optionally iterated by an occupancy determination element (not shown) disposed within a NOC, as is discussed above with reference to FIGS. 4 and 6, and the occupancy components provided to a corresponding subsector occupancy stores 801.1-801.N for retrieval by a corresponding subsector traffic control center 810.1-810.N. The NOC may be disposed at a separate location, within one of the subsector traffic control centers 810.1-810.N or at the regional traffic control center 830.

Each of the subsector occupancy aggregators 811 may access a corresponding subsector occupancy stores 801.1-801.N to obtain occupancy components corresponding to the portion of the one or more buildings corresponding to the one or more building types. In addition, each of the subsector occupancy aggregators 811 may access a corresponding subsector streaming consumption source 802.1-802.N and a corresponding subsector streaming weather source 803.1-803.N to obtain energy consumption data and outside temperature data, respectively, corresponding to the portion of the one or more buildings corresponding to the one or more building types. Each of the subsector occupancy aggregators 811 may process the occupancy components, energy consumption data, outside temperature data, and optional calendar data (e.g., day of the week, holidays, etc.) to determine average occupancy components corresponding to each of the building types by averaging all of the occupancy level components for the day $\gamma_i$, normalized occupancy profiles $f(h)$, and a marginal energy components D(T) for each of the buildings of a specific building type, and will transmit the average occupancy components to the other facility occupancy estimator 812 over buses G.1-G.N. Each of the subsector occupancy aggregators 811 may furthermore determine aggregated occupancy components for all of the one or more buildings within the portion by weighted averaging according to relative occupancy of each of the building types, and the each of the subsector occupancy aggregators 811 may provide their respective first aggregated occupancy component to a corresponding subsector traffic control processor 813 via bus GAGGR1.

As one skilled in the art will appreciate, not all buildings within a geographic subsector provide for streaming energy consumption data, but they are, however, subject to varying occupancy levels throughout the day. Accordingly, the other facility occupancy estimator 812 is configured to estimate the second aggregated occupancy component for the remaining buildings within the geographic subsector which are not part of the portion noted above. The other facility occupancy estimator 812 determines the second aggregated occupancy component for the remaining buildings within the geographic subsector by matching the average occupancy components provided over buses G.1-G.N to the remaining buildings according to building type, and by performing weighted averaging according to relative occupancy of each of the building types as is discussed above. The other facility occupancy estimator 812 may provide a respective second aggregated occupancy component to a corresponding subsector traffic control processor 813 via bus GAGGR2.

Each of the corresponding subsector traffic control processors 813 may employ their respective first and second aggregated occupancy components to determine an estimate of occupancy within each of the buildings in their respective geographic subsectors throughout the day, where the estimate of occupancy is determined exclusively by processing, as disclosed above, energy consumption and outside temperature data, or in the case where sufficient training data has been processed, exclusively by processing, as disclosed above, energy consumption data. Each subsector traffic control processor 813, in accordance with configuration data provided by the regional traffic control center 830, may modify default timing of traffic control devices to optimize the flow of pedestrian and automotive vehicles within its respective geographic subsector. Each subsector traffic control processor 813, in accordance with configuration data provided by the regional traffic control center 830, may modify default timing and states of signage to optimize the flow of pedestrian and automotive vehicles within its respective geographic subsector. Each subsector traffic control processor 813, in accordance with configuration data provided by the regional traffic control center 830, may optionally actuate traffic routing devices and/or controllable barriers to optimize the flow of pedestrian and automotive vehicles within its respective geographic subsector.

The regional traffic control center 830 may include a global controller 831 that provides configuration data to each of the subsector traffic control centers 810.1-810.N and that furthermore may provide control signals to prioritize or override commands to the subsector traffic control devices 820.1-820.N over the MCN.

Figure 9:
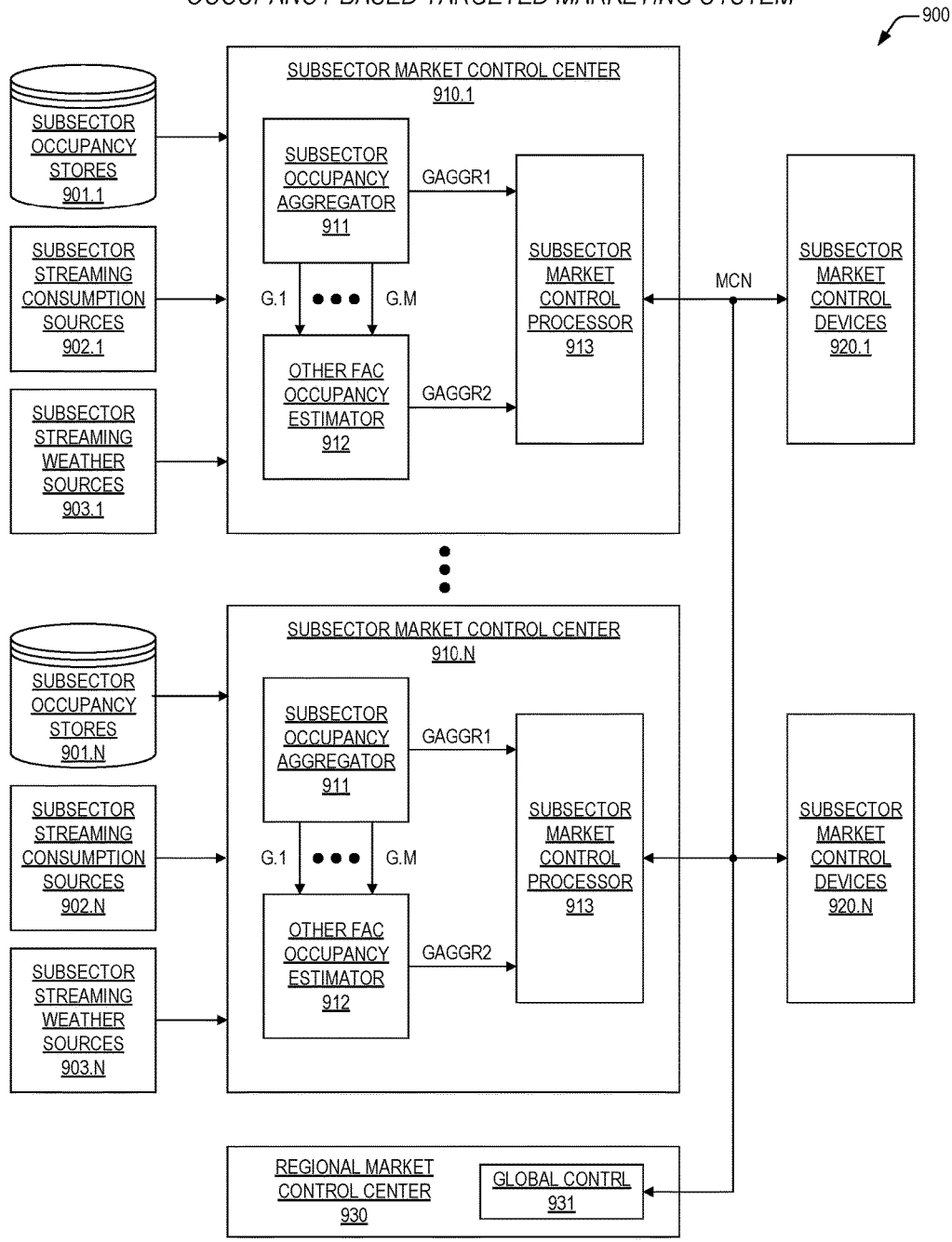
FIG. 9 is a block diagram featuring an occupancy based targeted marketing system according to the present invention.

Now turning to FIG. 9, a block diagram is presented featuring an occupancy based targeted marketing system according to the present invention. The occupancy based market control system 900 according to the present invention. The targeted marketing system 900 may include one or more subsector market control centers 910.1-910.N, coupled together via a conventional wired or wireless market control network MCN for purposes of communication of data and control of subsector market control devices 920.1-920.N, which are also coupled to the MCN. A regional market control center 930 is also coupled to the MCN. Each of the subsector market control centers 910.1-910.N are coupled to subsector occupancy stores 901.1-901-N, subsector consumption streaming sources 902.1-902.N, and subsector weather streaming sources 903.1-903.N. Each of the subsector market control centers 910.1-910.N may include a subsector occupancy aggregator 911 that is coupled to an other facility occupancy estimator 912 via one or more gamma buses G.1-G.M. The subsector occupancy aggregator 911 is coupled to a subsector market control processor 913 by a first aggregate gamma bus GAGGR1, and the other facility occupancy estimator 912 is coupled to the subsector market control processor 913 by a second aggregate gamma bus GAGGR2. Each of the market control processors 913 controls a corresponding subsector market control device 920.1-920.N over the MCN. The regional market control center 930 may include a global control element 931.

The market control centers 910.1-910.N, 930 may comprise hardware, or a combination of hardware and software, configured to perform the functions described hereinbelow. In one embodiment, market control centers 910.1-910.N, 930 may each comprise a microprocessor or other suitable central processing unit (CPU) (not shown) coupled to a transitory random access memory (not shown) and/or a non-transitory read-only memory (not shown) within which application programs (i.e., software) are disposed that, when executed by the microprocessor/CPU, perform the functions described hereinbelow. The occupancy stores 901.1-901.N may be disposed as conventional transitory or non-transitory data storage mechanisms and the buses G.1-G.M, GAGGR1, GAGGR2 may comprise conventional wired or wireless technology buses for transmission and reception of data including, but not limited to, direct wired (e.g., SATA), cellular, BLUETOOTH®, Wi-Fi, Ethernet, and the internet. The streaming sources 902.1-902.N, 903.1-903.N may comprise conventional wired or wireless technology buses as noted above for transmission and reception of data. The subsector market control devices 920.1-920.N may comprise, but are not limited to, controllable signage, video display devices, electronic mail servers, and short messaging service (SMS) servers.

The present inventors have noted that, in addition to the embodiments disclosed above, application of energy based occupancy determination is very useful for augmenting conventional market control techniques within areas that include office buildings, school, shopping malls, convention centers, airports, hospitals, and like facilities. Accordingly, in operation, the regional market control center 930 provides daily configuration data to each of the subsector market control centers 910.1-910.N, where each of the subsector market control centers 910.1-910.N are configured to control market control devices 920.1-910.N for corresponding geographic subsectors within a region. Each of the corresponding geographic subsectors may include a one or more buildings corresponding to one or more building types (e.g., small office building, medium office building, hospital, shopping mall, airport, school, etc.). A first portion of the one or more buildings corresponding to the one or more building types may be configured such that their energy consumption is available via a corresponding subsector streaming consumption source 902.1-902.N in real time or near real time at intervals consistent with those discussed above for determining and employing, for each of the first portion of the one or more buildings corresponding to the one or more building types, occupancy components that include an occupancy level component for the day $\gamma_i$, a normalized occupancy profile $f(h)$, and a marginal energy component $D(T)$. The noted occupancy components may be determined and optionally iterated by an occupancy determination element (not shown) disposed within a NOC, as is discussed above with reference to FIGS. 4 and 6, and the occupancy components provided to a corresponding subsector occupancy stores 901.1-901.N for retrieval by a corresponding subsector market control center 910.1-910.N. The NOC may be disposed at a separate location, within one of the subsector market control centers 910.1-910.N or at the regional market control center 930.

Each of the subsector occupancy aggregators 911 may access a corresponding subsector occupancy stores 901.1-901.N to obtain occupancy components corresponding to the first portion of the one or more buildings corresponding to the one or more building types. In addition, each of the subsector occupancy aggregators 911 may access a corresponding subsector streaming consumption source 902.1-902.N and a corresponding subsector streaming weather source 903.1-903.N to obtain energy consumption data and outside temperature data, respectively, corresponding to the first portion of the one or more buildings corresponding to the one or more building types. Each of the subsector occupancy aggregators 911 may process the occupancy components, energy consumption data, outside temperature data, and optional calendar data (e.g., day of the week, holidays, etc.) to determine average occupancy components corresponding to each of the building types by averaging all of the occupancy level components for the day $\gamma_i$, normalized occupancy profiles $f(h)$, and a marginal energy components $D(T)$ for each specific building type within the first portion of the one or more buildings, and will transmit the average occupancy components to the other facility occupancy estimator 912 over buses G.1-G.N. Each of the subsector occupancy aggregators 911 may furthermore determine aggregated occupancy components for all of the one or more buildings within the first portion by weighted averaging according to relative occupancy of each of the building types, and the each of the subsector occupancy aggregators 911 may provide their respective first aggregated occupancy component to a corresponding subsector market control processor 913 via bus GAGGR1.

As one skilled in the art will appreciate, not all buildings within a geographic subsector provide for streaming energy consumption data, but they are, however, subject to varying occupancy levels throughout the day. Accordingly, the other facility occupancy estimator 912 is configured to estimate the second aggregated occupancy component for a second portion of the one or more buildings within the geographic subsector which are not part of the first portion noted above. The other facility occupancy estimator 912 determines the second aggregated occupancy component for the remaining buildings within the geographic subsector by matching the average occupancy components provided over buses G.1-G.N to the remaining buildings according to building type, and by performing weighted averaging according to relative occupancy of each of the building types as is discussed above. The other facility occupancy estimator 912 may provide a respective second aggregated occupancy component to a corresponding subsector market control processor 913 via bus GAGGR2.

The other facility occupancy estimator 912 may further be configured to determine occupancy components for a third portion of the one or more buildings within the geographic subsector which are not part of the first or second portions discussed above, but whose occupancy components are determined by correlating occupancy components of selected building types within the first and second portions with corresponding building types within the third portion. For example, shopping mall occupancy levels are known to increase when schools are not in session. Similarly, hotel occupancy levels are known to increase when conventions are held. By determining occupancy levels of schools according to the present invention, occupancy levels of shopping malls within the geographic sector can be determined with a high degree of accuracy. Likewise, by determining occupancy levels of convention centers according to the present invention, occupancy levels of hotels within the geographic sector can be determined with a high degree of accuracy.

Each of the corresponding subsector market control processors 913 may employ their respective first and second aggregated occupancy components to determine an estimate of occupancy within each of the buildings in their respective geographic subsectors throughout the day, where the estimate of occupancy is determined exclusively by processing, as disclosed above, energy consumption and outside temperature data, or in the case where sufficient training data has been processed, exclusively by processing, as disclosed above, energy consumption data. Each subsector market control processor 913, in accordance with configuration data provided by the regional market control center 930, may modify default timing of market control devices to optimize presentation of targeted advertising to the flow of pedestrian and automotive vehicles within its respective geographic subsector. Each subsector market control processor 913, in accordance with configuration data provided by the regional market control center 930, may modify default timing and states of signage to optimize targeted advertising to the flow of pedestrian and automotive vehicles within its respective geographic subsector.

The subsector market control centers 910.1-910.N may be further configured to identify particular buildings within the first, second, and third portions for targeted messages, directed over the MCN, and executed by some of the subsector market control devices 920.1-920.N, that are directed towards increasing traffic flow, and thereby profit, for the particular buildings. For example, restaurants in the vicinity of a convention may well benefit from modifying their operating hours and signage to comport with occupancy levels of a convention center, stadium, and the like.

The regional market control center 930 may include a global controller 931 that provides configuration data to each of the subsector market control centers 910.1-910.N and that furthermore may provide control signals to prioritize or override commands to the subsector market control devices 920.1-920.N over the MCN.

Figure 10:
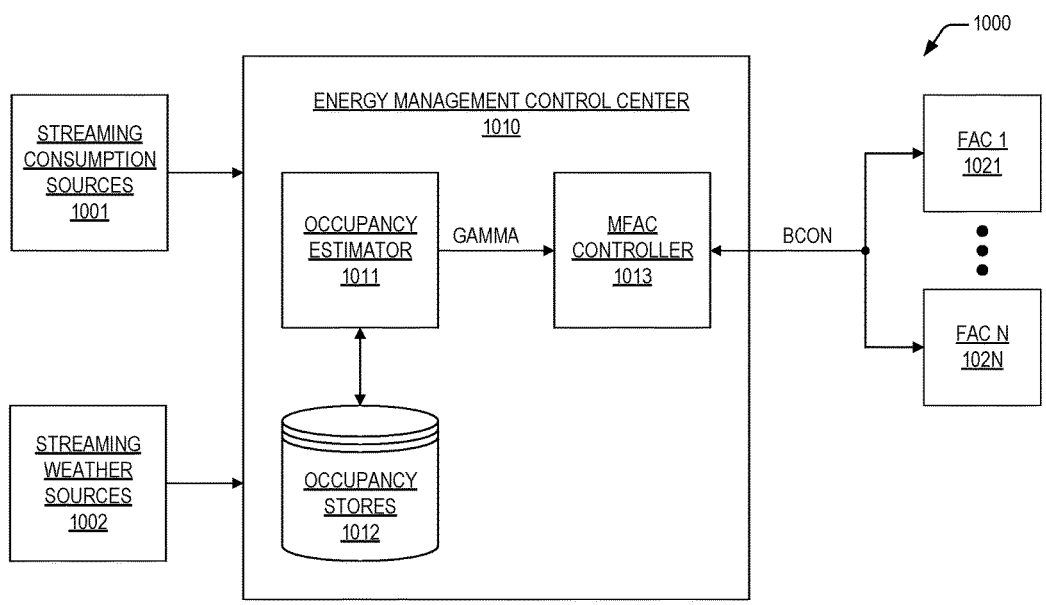
FIG. 10 is a block diagram showing a system according to the present invention for occupancy based energy management of multiple facilities.

Referring now to FIG. 10, a block diagram showing a system 1000 according to the present invention for occupancy based energy management of multiple facilities. The system 1000 includes an energy management control center 1010 that is coupled to streaming consumption sources 1001 and streaming weather sources 1002 corresponding to facilities 1021-102N whose energy consumption are to be managed, and which are coupled to the energy management control center 1010 via a building control bus BCON. A first portion of the facilities 1021-102N may include an occupancy based energy consumption management system as is disclosed above with reference to FIG. 4, or an energy management system employing estimated resource utilization as is disclosed above with reference to FIG. 6. Each of a second portion of the facilities 1021-102N may be similar to a corresponding one of the first portion of facilities 1021-102N in terms of building type (e.g., school, shopping mall, theater, etc.), and the some of the second portion of facilities 1021-102N may include a building automation system that does not perform occupancy determination as discussed herein. The energy management control center 1010 may also be configured to perform functions corresponding to a NOC as disclosed with reference to FIGS. 4 and 6. The energy management control center 1010 may include an occupancy estimator 1011 that is coupled to occupancy stores 1012 and to a multiple facility controller 1013 via a bus GAMMA.

The energy management control center 1010 may comprise hardware, or a combination of hardware and software, configured to perform the functions described hereinbelow. In one embodiment, the energy management control centers 1010 may comprise a microprocessor or other suitable central processing unit (CPU) (not shown) coupled to a transitory random access memory (not shown) and/or a non-transitory read-only memory (not shown) within which application programs (i.e., software) are disposed that, when executed by the microprocessor/CPU, perform the functions described hereinbelow. The occupancy stores 1012 may be disposed as conventional transitory or non-transitory data storage mechanisms and the buses GAMMA, BCON may comprise conventional wired or wireless technology buses for transmission and reception of data including, but not limited to, direct wired (e.g., SATA), cellular, BLUETOOTH®, Wi-Fi, Ethernet, and the internet. The streaming sources 1001-1002 may comprise conventional wired or wireless technology buses as noted above for transmission and reception of data.

In operation, streaming energy consumption data and outside temperature data corresponding to the first portion of the facilities 1021-102N are obtained by the energy management control center 1010 and are provided to the occupancy estimator 1011. Occupancy components that include an occupancy level component for the day $\gamma_i$, a normalized occupancy profile $f(h)$, and a marginal energy component $D(T)$ for each of the facilities 1021-102N, which are derived as disclosed above from corresponding training data sets, are also obtained from the occupancy stores 1012. Based on the energy consumption and outside temperature data obtained, the occupancy estimator 1011 determines occupancy levels for the first portion of the facilities 1021-102N, and provides these occupancy levels periodically to the multiple facility controller 1013. The occupancy estimator 1011 is further configured to assign an occupancy level for the each of the second portion of facilities 1021-102N, where the occupancy level is that of the corresponding one of the first portion of facilities 1021-102N in terms of building type.

The multiple facility controller 1013 may be configured to optimize execution of a demand response program event for all of the facilities 1021-102N, or configured to optimize time of use energy consumption for all of the facilities 1021-102N, or may be configured to optimize energy consumption of all of the facilities 1021-102N according to an energy efficiency incentive. Accordingly, the multiple facility controller 1013 may transmit energy reduction control messages to one or more of the facilities 1021-102N over the BCN that cause the one or more of the facilities 1021-102N to reduce energy consumption by a prescribed amount for a prescribed period of time to achieve objectives of the program event, time of use energy consumption, or energy efficiency incentive. The multiple facility controller 1013 may select the one or more of the facilities 1021-102N based on a global energy use model for all of the facilities 1021-102N that is determined in part by occupancy levels throughout the day of the facilities 1021-102N, where the occupancy levels are determined solely from outside temperature data and energy consumption obtained from the streaming sources 1001-1002. For facilities 1021-102N having well established occupancy components, such as an elementary school, only energy consumption data is necessary for the occupancy estimator 1011 to determine occupancy levels throughout the day.

Figure 11:
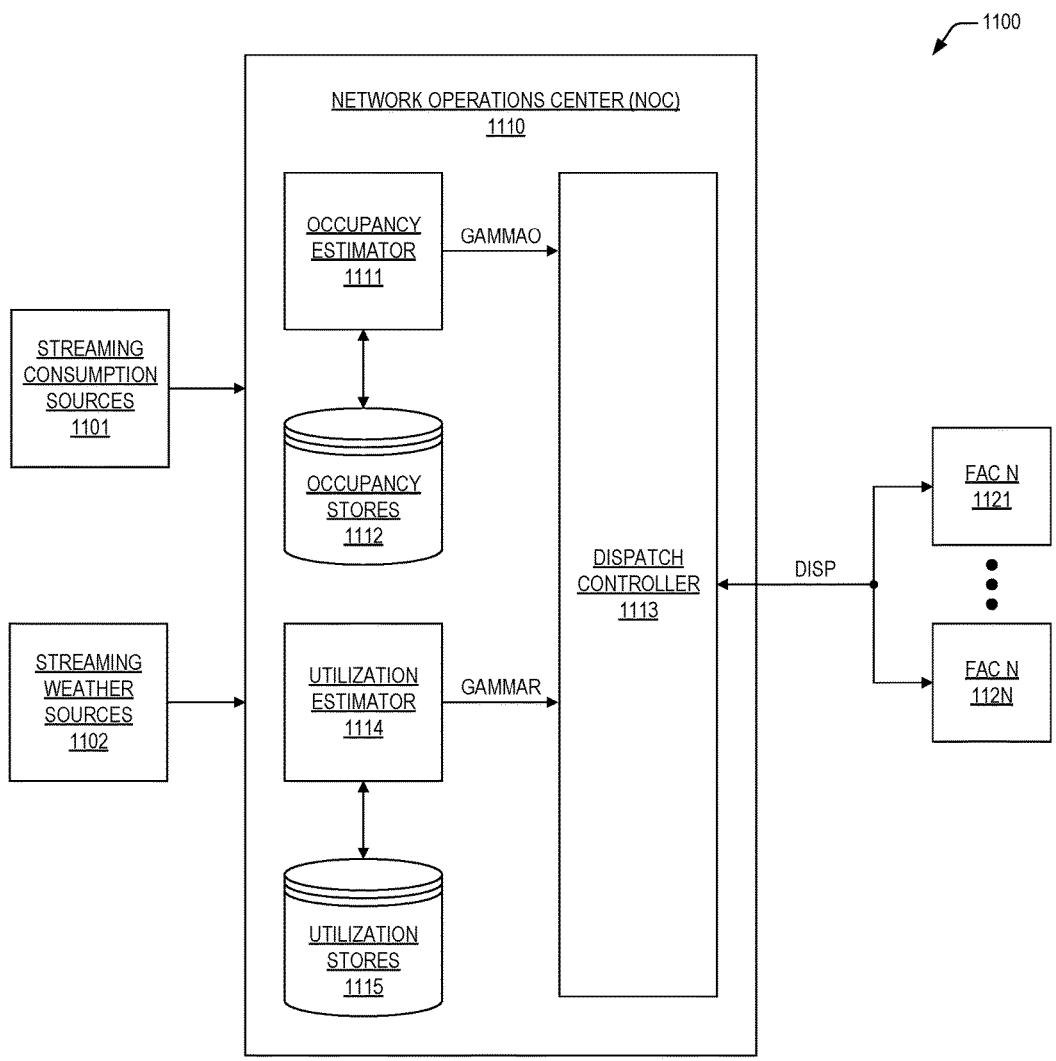
FIG. 11 is a block diagram detailing a mechanism according to the present invention for prioritizing demand response program events.

Now referring to FIG. 11, a block diagram 1100 detailing a mechanism according to the present invention for prioritizing demand response program events. The diagram 1100 shows a network operations center (NOC) 1110 that is coupled to streaming consumption sources 1101 and streaming weather sources 1102 corresponding to facilities 1121-112N that may be participating in a demand response program, and which are coupled to the NOC 1110 via a dispatch bus DISP.

A first portion of the facilities 1021-102N may include a mechanism (not shown) that allows for transmission of energy consumption data over the streaming consumption sources 1101 to the NOC 1110 in real time or near real time. Each of a second portion of the facilities 1021-102N may be similar to a corresponding one of the first portion of facilities 1021-102N in terms of building type (e.g., school, shopping mall, theater, etc.). The NOC 1110 may include an occupancy estimator 1111 that is coupled to occupancy stores 1112 and to a dispatch controller 1113 via a bus GAMMAO. The NOC 1110 may also include a utilization estimator 1114 that is coupled to utilization stores 1112 and to the dispatch controller 1113 via a bus GAMMAR.

The NOC 1110 may comprise hardware, or a combination of hardware and software, configured to perform the functions described hereinbelow. In one embodiment, the NOC 1110 may comprise a microprocessor or other suitable central processing unit (CPU) (not shown) coupled to a transitory random access memory (not shown) and/or a non-transitory read-only memory (not shown) within which application programs (i.e., software) are disposed that, when executed by the microprocessor/CPU, perform the functions described hereinbelow. The occupancy stores 1012 may be disposed as conventional transitory or non-transitory data storage mechanisms and the buses GAMMAO, GAMMAR, DISP may comprise conventional wired or wireless technology buses for transmission and reception of data including, but not limited to, direct wired (e.g., SATA), cellular, BLUETOOTH®, Wi-Fi, Ethernet, and the internet. The streaming sources 1101-1102 may comprise conventional wired or wireless technology buses as noted above for transmission and reception of data.

In operation, streaming energy consumption data and outside temperature data corresponding to the first portion of the facilities 1021-102N are obtained by the NOC 1110 and are provided to the occupancy estimator 1011 or utilization estimator 1114 according to facility type as has been described in detail above with reference to FIGS. 4 and 7. For occupancy based building types, occupancy components that include an occupancy level component for the day $\gamma_i$, a normalized occupancy profile $f(h)$, and a marginal energy component $D(T)$ for each of the facilities 1121-112N, which are derived as disclosed above from corresponding training data sets, are also obtained from the occupancy stores 1112. For utilization based building types, occupancy components that include an occupancy level component for the day $\gamma_i$, a normalized occupancy profile $f(h)$, and a marginal energy component $D(T)$ for each of the facilities 1121-112N, which are derived as disclosed above from corresponding training data sets, are also obtained from the utilization stores 1115. Based on the energy consumption and outside temperature data obtained, the occupancy estimator 1111 determines occupancy/utilization levels for the first portion of the facilities 1121-112N, and provides these occupancy/utilization levels periodically to the dispatch controller 1113. The occupancy estimator 1111 and utilization estimator 1114 are further configured to assign an occupancy level or utilization level, as appropriate, for each of the second portion of facilities 1121-112N, where the occupancy level or utilization level, as appropriate, is that of the corresponding one of the first portion of facilities 1121-112N in terms of building type.

The dispatch controller 1113 may be configured to optimize execution of a demand response program event by prioritizing program event dispatch messages to the facilities 1121-112N. Accordingly, the dispatch controller 1113 may transmit program event dispatch messages to one or more of the facilities 1021-102N over the BCN that cause the one or more of the facilities 1121-112N to reduce energy consumption by a prescribed amount for a prescribed period of time to achieve objectives of the program event. The dispatch controller 1113 may select the one or more of the facilities 1121-112N based on a global energy use model for all of the facilities 1121-112N that is determined in part by occupancy/utilization levels throughout the day of the facilities 1121-112N, where the occupancy levels are determined solely from outside temperature data and energy consumption obtained from the streaming sources 1121-112N. For facilities 1121-112N having well established occupancy components, such as an elementary school, only energy consumption data is necessary for the occupancy estimator 1111 or utilization estimator 1114, as appropriate, to determine occupancy/utilization levels throughout the day. In one embodiment, the dispatch controller 1113 will select the one or more of the facilities 1121-112N because each of their respective energy use profiles significantly varies from an average of the each of their respective energy use profiles, where all of the one or more of the facilities 1121-112N are of the same building type (e.g., a grocery store, an aggregate plant, or a steel mill). In one embodiment, the dispatch controller 1113 selects the one or more of the facilities 1121-112N because each of their respective energy use profiles varies more than 20 percent from an average of their energy use profiles.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. An apparatus for prioritizing a demand response program event based on occupancy for one or more buildings of one or more building types participating in a demand response program, the apparatus comprising:
    a network operations center, comprising a central processing unit, transitory memory, and non-transitory read-only memory having computer code disposed therein, said computer code comprising:
        a first application program, executable to perform functions of an occupancy estimator, configured to receive energy consumption and outside temperature streams $E_i(h,T)$ corresponding to a portion of the one or more buildings, and configured to employ occupancy components for each of the one or more buildings within said portion to process said streams, and configured to generate occupancy levels corresponding to the one or more buildings within said portion, wherein said occupancy components and said occupancy levels are generated by exclusively processing said streams, and configured to assign said occupancy levels to remaining ones of the one or more buildings not in said portion, said occupancy components comprising:
            a lower bound of energy consumption, $\zeta(T)$, as a function of outside temperature, T, when a corresponding one of said one or more buildings is at minimum occupancy;
            a normalized occupancy profile component, $f(h)$ as a function of a prescribed time increment, h;
            a marginal energy consumption component, $D(T)$ as a function of T; and
            a daily occupancy level component, $\gamma_i$ for each of a first plurality of days, i;
            wherein $\gamma_i$ is determined according to the following equation:

$$\gamma_i = \frac{\sum_h \Delta_i(h, T)}{\sum_h f(h)D(T)};$$

and wherein $\Delta_i(h,T)=E_i(h,T)-\zeta(T)$; and
        a second application program, executable to perform functions of a dispatch controller, configured to optimize execution of the demand response program event by employing said occupancy components to maintain a global energy use model for the one or more buildings to prioritize dispatch messages to the one or more buildings, and configured to transmit prioritized dispatch messages to selected ones of the one or more buildings that cause said selected ones of the one or more buildings to reduce energy consumption by a prescribed amount for a prescribed period of time, to achieve objectives of the demand response program event.

2. The apparatus as recited in claim 1, wherein said NOC is configured to generate said occupancy components by processing training data sets comprising energy consumption and outside temperature data for each of the one or more buildings in said portion, and wherein said energy consumption and outside temperature data taken at said prescribed time increment over said plurality of days.

3. The apparatus as recited in claim 2, wherein said NOC progressively revises said occupancy components by additionally processing said streams.

4. The apparatus as recited in claim 2, wherein said prescribed time increment ranges from 5 minutes to 2 hours.

5. The apparatus as recited in claim 2, where said plurality of days ranges from 30 days to 365 days.

6. The apparatus as recited in claim 1, wherein said dispatch controller selects said selected ones of the one or more buildings when each of their respective energy use profiles varies more than 20 percent from an average of their energy use profiles.

7. The apparatus as recited in claim 1, wherein said occupancy estimator assigns said occupancy levels to remaining ones of the one or more buildings not in said first portion based on building type.

8. An energy management apparatus comprising:
    a network operations center, comprising a central processing unit, transitory memory, and non-transitory read-only memory having application programs disposed therein, said application programs comprising:
computer readable program code executable to prioritize a demand response program event based on occupancy for one or more buildings of one or more building types participating in a demand response program event, said computer readable code comprising:
first program code for providing an occupancy estimator, configured to receive energy consumption and outside temperature streams $E_i(h,T)$ corresponding to a portion of the one or more buildings, and configured to employ occupancy components for each of the one or more buildings within said portion to process said streams, and configured to generate occupancy levels corresponding to the one or more buildings within said portion, wherein said occupancy components and said occupancy levels are generated by exclusively processing said streams, and configured to assign said occupancy levels to remaining ones of the one or more buildings not in said portion according to building type, said occupancy components comprising:
a lower bound of energy consumption, $\zeta(T)$, as a function of outside temperature, T, when a corresponding one of said one or more buildings is at minimum occupancy;
a normalized occupancy profile component, $f(h)$ as a function of a prescribed time increment, h;
a marginal energy consumption component, $D(T)$ as a function of T; and
a daily occupancy level component, $\gamma_i$ for each of a first plurality of days, i;
wherein $\gamma_i$ is determined according to the following equation:

$$\gamma_i = \frac{\sum_h \Delta_i(h, T)}{\sum_h f(h)D(T)};$$

and wherein $\Delta_i(h,T) = E_i(h,T) - \zeta(T)$; and
second program code for providing a dispatch controller, configured to optimize execution of the demand response program event by employing said occupancy components to maintain a global energy use model for the one or more buildings to prioritize dispatch messages to the one or more buildings, and configured to transmit prioritized dispatch messages to selected ones of the one or more buildings that cause said selected ones of the one or more buildings to reduce energy consumption by a prescribed amount for a prescribed period of time, to achieve objectives of the demand response program event.

9. The apparatus as recited in claim 8, wherein said NOC is configured to generate said occupancy components by processing training data sets comprising energy consumption and outside temperature data for each of the one or more buildings in said portion, and wherein said energy consumption and outside temperature data taken at a prescribed time increment over said plurality of days.

10. The apparatus as recited in claim 9, wherein said NOC progressively revises said occupancy components by additionally processing said streams.

11. The apparatus as recited in claim 9, wherein said prescribed time increment ranges from 5 minutes to 2 hours.

12. The apparatus as recited in claim 9, where said plurality of days ranges from 30 days to 365 days.

13. The apparatus as recited in claim 8, wherein said dispatch controller selects said selected ones of the one or more buildings when each of their respective energy use profiles varies more than 20 percent from an average of their energy use profiles.

14. The apparatus as recited in claim 8, wherein said occupancy estimator assigns said occupancy levels to remaining ones of the one or more buildings not in said first portion based on building type.

15. A method for prioritizing a demand response program event based on occupancy for one or more buildings of one or more building types participating in a demand response program, the method comprising:
via a first application disposed in non-transitory memory that is executable by a central processing unit disposed in a network operations center, receiving energy consumption and outside temperature streams $E_i(h,T)$ corresponding to a portion of the one or more buildings, and employing occupancy components for each of the one or more buildings within the portion to process the streams, and generating occupancy levels corresponding to the one or more buildings within the portion, wherein the occupancy components and the occupancy levels are generated by exclusively processing the streams, and assigning the occupancy levels to remaining ones of the one or more buildings not in the portion, the occupancy components comprising:
a lower bound of energy consumption, $\zeta(T)$, as a function of outside temperature, T, when a corresponding one of said one or more buildings is at minimum occupancy;
a normalized occupancy profile component, $f(h)$ as a function of a prescribed time increment, h;
a marginal energy consumption component, $D(T)$ as a function of T; and
a daily occupancy level component, $\gamma_i$ for each of a first plurality of days, i;
wherein $\gamma_i$ is determined according to the following equation:

$$\gamma_i = \frac{\sum_h \Delta_i(h, T)}{\sum_h f(h)D(T)};$$

and wherein $\Delta_i(h,T) = E_i(h,T) - \zeta(T)$; and
via a second application disposed in the non-transitory memory that is executable by the central processing unit disposed in the network operations center, optimizing execution of the demand response program event by employing the occupancy components to maintain a global energy use model for the one or more buildings to prioritize dispatch messages to the one or more buildings, and transmitting prioritized dispatch messages to selected ones of the one or more buildings that cause said selected ones of the one or more buildings to reduce energy consumption by a prescribed amount for a prescribed period of time, to achieve objectives of the demand response program event.

16. The method as recited in claim 15, wherein the NOC is configured to generate the occupancy components by processing training data sets comprising energy consumption and outside temperature data for each of the one or more buildings in the portion, the energy consumption and outside temperature data taken at the prescribed time increment over the plurality of days.

17. The method as recited in claim 16, wherein the NOC progressively revises the occupancy components by additionally processing the streams.

18. The method as recited in claim 16, wherein the prescribed time increment ranges from 5 minutes to 2 hours.

19. The method as recited in claim 16, where the plurality of days ranges from 30 days to 365 days.

20. The method as recited in claim 15, wherein the dispatch controller selects the selected ones of the one or more buildings when each of their respective energy use profiles varies more than 20 percent from an average of their energy use profiles.

21. The method as recited in claim 15, wherein the occupancy estimator assigns the occupancy levels to remaining ones of the one or more buildings not in the first portion based on building type.

* * * * *